(12) United States Patent
Ohmori

(10) Patent No.: US 6,510,109 B2
(45) Date of Patent: Jan. 21, 2003

(54) MAGNETIC HEAD INCLUDING STEPPED CORE AND MAGNETO-OPTICAL RECORDING DEVICE USING THE SAME

(75) Inventor: Takashi Ohmori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/926,548

(22) PCT Filed: Mar. 9, 2001

(86) PCT No.: PCT/JP01/01881

§ 371 (c)(1),
(2), (4) Date: Nov. 19, 2001

(87) PCT Pub. No.: WO01/71712

PCT Pub. Date: Sep. 27, 2001

(65) Prior Publication Data

US 2002/0163862 A1 Nov. 7, 2002

(30) Foreign Application Priority Data

Mar. 17, 2000 (JP) .......................................... 2000-081852

(51) Int. Cl.[7] .............................................. G11B 11/00
(52) U.S. Cl. ................................ 369/13.23; 369/13.17; 360/234.7
(58) Field of Search .......................... 369/13.17, 13.14, 369/13.23, 253, 13.2, 77.2, 256; 360/122, 123, 125, 129, 119, 59, 234.7, 323, 319, 244.4, 245.9, 246.2, 234.3, 234.6, 245.3, 236.6

(56) References Cited

U.S. PATENT DOCUMENTS

| 5,107,471 A | * | 4/1992 | Miyake et al. .......... 360/119 X |
| 5,260,921 A | * | 11/1993 | Shibuya et al. ........... 360/59 X |
| 5,572,490 A | * | 11/1996 | Kazama .................... 360/234.7 |
| 5,703,840 A | * | 12/1997 | Kazama .................... 360/59 X |

FOREIGN PATENT DOCUMENTS

| JP | 2-79201 | 3/1990 |
| JP | 4-105234 | 4/1992 |
| JP | 6-124401 | 5/1994 |
| JP | 6-176429 | 6/1994 |
| JP | 8-45129 | 2/1996 |
| JP | 10188202 | * 7/1998 |

* cited by examiner

Primary Examiner—Ali Neyzari
(74) Attorney, Agent, or Firm—Oblon, Spivak, McClelland, Maier & Neustadt, P.C.

(57) ABSTRACT

A magnetic head for supplying a magnetic field in recording an information signal to a recording medium is provided. This magnetic head has a substantially prism-shaped magnetic core portion having a distal end portion cut out to form a step, the magnetic core portion being form so that the cross-sectional area of the distal end portion is smaller than the cross-sectional area of a proximal end portion, and a coil wound on the outer circumferential surface of the magnetic core portion, wherein the length of one side of the distal end portion is not less than 0.3 mm and not more than 0.45 mm, and the length of the other side orthogonal to the one side is not less than 0.4 mm and not more than 0.55 mm.

6 Claims, 17 Drawing Sheets

MAGNETIC HEAD INCLUDING STEPPED CORE AND MAGNETO-OPTICAL RECORDING DEVICE USING THE SAME

TECHNICAL FIELD

This invention relates to a magnetic head, and a magnetic head and a magneto-optical disc recording device used for recording on a recording medium. Particularly, this invention relates to a magnetic head for supplying a magnetic field when recording an information signal onto a recording medium, and a magnetic head and a magneto-optical disc recording device used for recording on a recording medium.

BACKGROUND ART

There have been used magnetic recording media such as a magnetic disk and a magnetic tape on which an information signal is magnetically recorded and reproduced, and magneto-optical recording media such as a magneto-optical disc on which an information signal is recorded and reproduced by using the magneto-optical effect of a recording film.

On a magnetic recording medium such as a magnetic disk or a magnetic tape, an external magnetic field is applied to change the local direction of magnetization of the magnetic recording medium by using a magnetic head, thus writing an information signal.

On the other hand, on a magneto-optical recording medium such as a magneto-optical disc, while a condensed laser beam is cast onto a recording film, an external vertical magnetic field modulated in accordance with an information signal is applied by using a magnetic head to a portion which is locally heated to the Curie temperature or higher, thus writing the information signal. That is, in the portion heated to the Curie temperature or higher of the recording film of the recording medium, the coercive force is lost and the direction of magnetization is changed in accordance with the external magnetic field. On the magneto-optical recording medium, a laser beam which is weaker than in recording is cast onto the recording film and the rotation of the plane of polarization of the laser beam corresponding to the direction of magnetization due to a Kerr effect is detected, thus reading out the information signal.

An example of the magnetic head used for the magneto-optical recording medium will now be described with reference to FIG. 1. A magnetic head 200 shown in FIG. 1 has a magnetic core member 202 on which a coil 201 for magnetic modulation is wound. The magnetic core member 202 is made of a material having a high magnetic permeability and has a substantially prism-shaped base 203, substantially prism-shaped yokes 204a, 204b provided to protrude upward from both ends of the base 203, and a substantially prism-shaped magnetic core 205 provided to stand upward from the base 203 at a position between the yokes 204a, 204b, as shown in FIG. 2. On outer circumferential surface of the magnetic core 205 of the magnetic core member 202, the coil 201 is wound as shown in FIG. 1.

When a current corresponding to an information signal is supplied to the coil 201, the magnetic head 200 generates a magnetically modulated vertical magnetic field from a distal end portion 205a of the magnetic core 205 on which the coil 201. is wound. In the magnetic head 200, the distal end portion 205a of the magnetic core 205 is cause to closely contact or slide in contact with the magneto-optical recording medium, and the vertical magnetic field generated from the distal end portion 205a of the magnetic core 205 is applied to the recording film of the magneto-optical recording medium, thus writing the information signal to the magneto-optical recording medium.

For a magneto-optical recording medium, a recording/reproducing device for the purpose of recording and reproducing music data is practically used. With such a recording/reproducing device for carrying out recording and reproduction on a magneto-optical disc, though a sufficient transfer rate is achieved in the case of recording and reproducing ordinary music data, a higher transfer rate is desired in the case of recording and reproducing image data in a computer or the like. As for music data, too, a higher transfer rate is desired in the case where duplication or shift is carried out.

To realize such a higher transfer rate, power saving and improvement in the magnetic field inversion band are made in the recording/reproducing device. Specifically, the inductance of the magnetic head 200 is reduced and miniaturization of the magnetic head 200 is done. Particularly, since the magnetic field is narrowed down and concentrated at the distal end portion 205a of the magnetic core 205, improvement in the generation efficiency of the magnetic field due to a so-called edge effect can be realized by narrowing the distal end portion 205a.

In the magnetic head 200 shown in FIG. 1, narrowing the distal end portion 205a of the magnetic core 205 causes reduction in the cross-sectional area of the distal end portion 205a. Therefore, the range where an effective magnetic field is obtained is narrowed and it is difficult to carry out appropriate write operation onto the magneto-optical recording medium. That is, if the area of the distal end portion 205a of the magnetic core 205 is reduced, the intensity of an effective magnetic field applied to a predetermined recording track on the magneto-optical recording medium is insufficient for a positional deviation that is generated when an actuator for driving an objective lens within the recording/reproducing device into a focusing direction and a tracking direction makes a fine adjustment of the position of the objective lens, a positional deviation that is generated when the magneto-optical recording medium is loaded on the recording/reproducing device, and a positional deviation that is generated by the fluctuation of the magnetic head in the direction of height due to the wavering of the magneto-optical recording medium. Therefore, it is very difficult to carry out stable write operation of the information signal onto the magneto-optical recording medium.

If the distal end portion 205a of the magnetic core 205 is narrowed, the heat generated in the magnetic core member 202 concentrates at the magnetic core 205 and the magnetic core 205 is deteriorated by a high temperature. Therefore, a sufficient magnetic field cannot be generated.

Generally, in the magnetic head 200, when a current corresponding to an information signal is supplied to the coil 201, a magnetic field modulated by the information signal to be recorded is generated from the distal end portion 205a of the magnetic core 205 on which the coil 201 is wound. In this case, electric losses proportionate to the number of inversions of the magnetic field are generated. The electric losses mainly include a hysteresis loss due to the delay in the change of the direction of magnetization within the magnetic core member 202 from the change of the magnetic field by the coil 201, and an eddy-current loss due to the flow of an eddy current induced by the inversion of the magnetic field within the magnetic core member 202. All these losses are consumed as heat.

In the case where recording of music data is to be carried out as in the conventional technique, the calorific value due to the above-described electric losses is relatively small because of a low data transfer rate. Moreover, since the distal end portion. 205a of the magnetic core 205 has a large cross-sectional area and can efficiently release the generated heat toward the base 203 and the yokes 204a, 204b of the magnetic core member 202, the influence of such heating is not problematical.

However, in the case where the data transfer rate is high, the number of inversions of the external vertical magnetic field applied to the magneto-optical recording medium increases and therefore the calorific value due to the above-described electric losses increases, too. If the distal end portion 205a of the magnetic core 205 is narrowed, the generated heat cannot be efficiently released toward the base 203 and the yokes 204a, 204b of the magnetic core member 202 and the generated heat concentrates at the magnetic core 205, thus causing an abrupt increase in the temperature of the magnetic core 205. Moreover, in the magnetic head 200, it is often the case that a substantially cylindrical bobbin having the coil 201 wound on its outer circumferential surface is inserted in the magnetic core 205. If such a bobbin made of a synthetic resin or the like having a poor thermal conductivity is mounted on the outer circumferential surface of the magnetic core 205, the radiation property of the magnetic core 205 is deteriorated.

As a result, the temperature of the magnetic core 205 rises close to the Curie point and the magnetic core 205 becomes magnetically unstable. Therefore, appropriate write operation to the magneto-optical recording medium cannot be carried out. If the temperature rises to a point where the inductance is reduced, the current flowing through the coil 201 increases to generate thermal runaway, which may damage the magnetic head 200 or may damage a magnetic head unit or a recording/reproducing device using this magnetic head 200.

DISCLOSURE OF THE INVENTION

Thus, it is an object of the present invention to a magnetic head for supplying a magnetic field when recording an information signal onto a recording medium, and a magnetic head and a magneto-optical disc recording device used for recording on a recording medium, which enable solution of the above-described problem of the conventional magnetic head, restraint of magnetic deterioration due to heating, and realization of a higher transfer rate.

A magnetic head according to the present invention comprises: a substantially prism-shaped magnetic core portion having a distal end portion cut out to form a step, the magnetic core portion being form so that the cross-sectional area of the distal end portion is smaller than the cross-sectional area of a proximal end portion; and a coil wound on the outer circumferential surface of the magnetic core portion. The length of one side of the distal end portion is not less than 0.3 mm and not more than 0.45 mm, and the length of the other side orthogonal to the one side is not less than 0.4 mm and not more than 0.55 mm.

The height of the step formed at the distal end portion of the magnetic core portion is set to be not less than 0.3 mm and not more than a half of the length of the magnetic core portion.

Another magnetic head according to the present invention comprises: a core formed substantially in an E-shape by a substantially prism-shaped magnetic core portion having a distal end portion cut out to form a step, the magnetic core portion being form so that the cross-sectional area of the distal end portion is smaller than the cross-sectional area of a proximal end portion, and a pair of yokes arranged on both sides of the magnetic core portion; and a coil wound on the outer circumferential surface of the magnetic core portion and supplied with a current based on an information signal to be recorded onto a recording medium. The length of one side of the distal end portion of the magnetic core portion that is substantially parallel to the direction of movement of the recording medium is not less than 0.3 mm and not more than 0.45 mm, and the length of one side substantially orthogonal to the direction of movement of the recording medium is not less than 0.4 mm and not more than 0.55 mm.

A magneto-optical disc recording device according to the present invention comprises: an optical pickup unit arranged on the side of one surface of a magneto-optical disc and adapted for casing a condensed light beam to the magneto-optical disc; and a magnetic head arranged on the side of the other surface of the magneto-optical disc to face the optical pickup unit and adapted for applying an external magnetic field based on an information signal to be recorded onto the magneto-optical disc. The magnetic head used in this device has a core formed substantially in an E-shape by a substantially prism-shaped magnetic core portion having a distal end portion cut out to form a step, the magnetic core portion being formed so that the cross-sectional area of the distal end portion is smaller than the cross-sectional area of a proximal end portion, and a pair of yokes arranged on both sides of the magnetic core portion, and the magnetic head also has a coil wound on the outer circumferential surface of the magnetic core portion. The length of one side of the distal end portion substantially orthogonal to a recording track on the magneto-optical disc is not less than 0.3 mm and not more than 0.45 mm, and the length of one side substantially parallel to the recording track of the magneto-optical disc is not less than 0.4 mm and not more than 0.55 mm.

The other objects and specific advantages of the present invention will be further clarified by the following description of embodiments.

BEST MODE FOR CARRYING OUT THE INVENTION

A magnetic head according to the present invention and a magneto-optical recording/reproducing device using this magnetic head will now be described in detail with reference to the drawings.

First, an example will be described in which the present invention is applied to a magnetic head for applying an external magnetic field modulated in accordance with an information signal to a magneto-optical disc at the time of recording.

Prior to the description of the present invention, a disc cartridge is described in which a magneto-optical disc used as a recording medium for a magneto-optical recording/reproducing device using the magnetic bead according to the present invention is housed.

Figure 3:
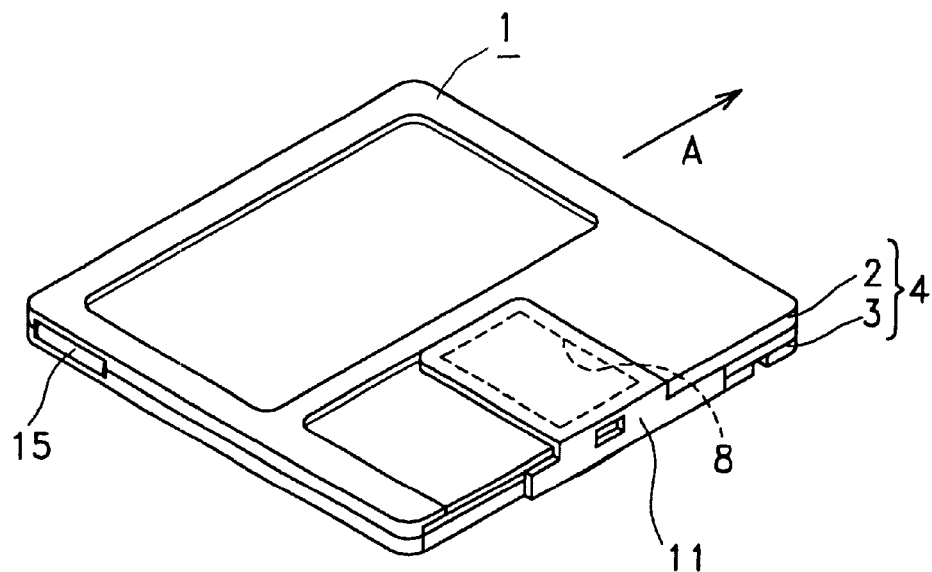
FIG. 3 is a perspective view showing a disc cartridge used in a magneto-optical recording/reproducing device to which the present invention is applied.
Figure 4:
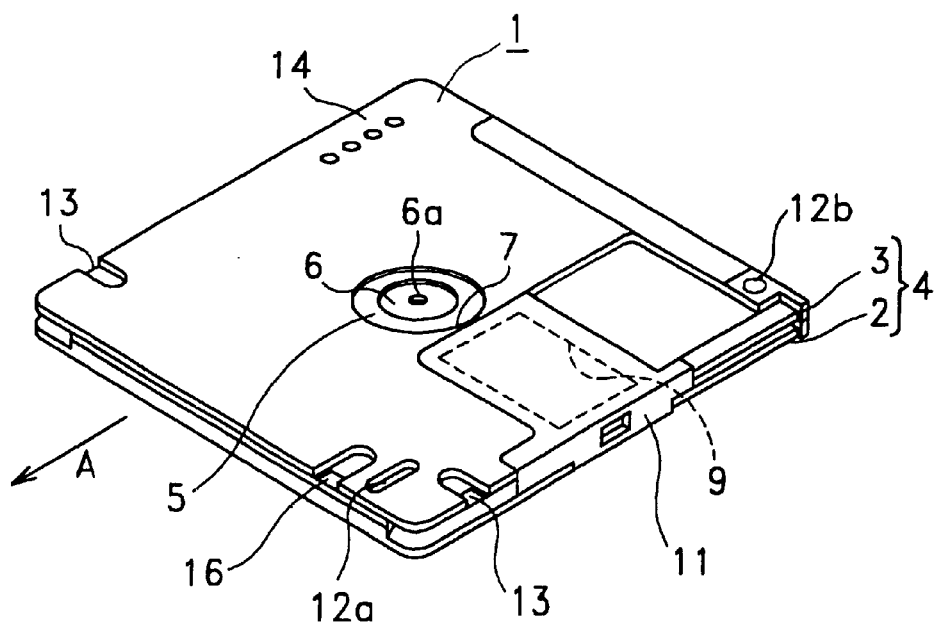
FIG. 4 is a perspective view showing the disc cartridge, as viewed from the bottom.

This disc cartridge has a cartridge body 4 formed by abutting a pair of upper half 2 and lower half 3 to each other and connecting their circumferential edges by a plurality of screws or an adhesive, and a magneto-optical disc 5 rotatably housed inside the cartridge body 4, as shown in FIGS. 3 and 4.

The magneto-optical disc 5 is formed by applying a recording film (hereinafter referred to as a signal recording layer) made of a magnetic material onto a disc substrate made of a transparent synthetic resin material such as polycarbonate and having a diameter of approximately 64 mm. A center hole is provided substantially at a central part of the disc substrate of this magneto-optical disc 5, and a chucking plate 6 for the purpose of chucking with a magnet provided on a disc table, which will be described later, is attached to the center hole. The chucking plate 6 is made of a ferromagnetic material such as a metal having a substantially circular flat plate-like shape, and is joined and attached to the disc substrate by caulking a part of the disc substrate with heat or ultrasonic waves or by using an adhesive. A hole 6a is provided substantially at a central part of the chucking plate 6.

The pair of upper half 2 and lower half 3 constituting the cartridge body 4 is formed in a substantially rectangular flat plate-like shape with a synthetic resin, and the length of one side thereof is substantially equal to the diameter of the magneto-optical disc 5 housed therein. Substantially at a central part of the lower half 3, a chucking aperture 7 for exposing outward the chucking plate 6 attached to the magneto-optical disc 5 is provided. The chucking aperture 7 has a substantially circular shape and is formed with a size such that a disc table attached to a spindle motor of the magneto-optical recording/reproducing device, which will be described later, can enter the chucking aperture 7.

On the cartridge body 4, there are provided a substantially rectangular head aperture 8 formed on the side of the upper half 2 with a size such that a magnetic head unit of the magneto-optical recording/reproducing device, which will be described later, can operate between the inner and outer circles on the major surface of the magneto-optical disc 5, and a substantially rectangular pickup aperture 9 formed at a position facing the head aperture, on the side of the lower half 3, with a size such that an optical pickup unit of the magneto-optical recording/reproducing device, which will be described later, can scan between the inner and outer circles on the major surface of the magneto-optical disc 5.

The disc cartridge 1 has a shutter member 11 for preventing entry of dust and particles from the head aperture 8 and the pickup aperture 9. The shutter member.11 closes the head aperture 8 and the pickup aperture 9 and is attached to the cartridge body 4 so that it is slidable substantially in parallel with the direction of arrow A in FIGS. 3 and 4, which is the direction of insertion/ejection of the disc cartridge 1 to/from the recording device. When the disc cartridge 1 is not used, the shutter member 11 is locked by a lock member to a position for closing the head aperture 8 and the pickup aperture 9. When the disc cartridge 1 is inserted into the magneto-optical recording/reproducing device, the locking of the shutter member 11 by the lock member is canceled, interlocking with a shutter opening mechanism of the recording device, and the shutter member 11 is moved in the direction for opening the head aperture 8 and the pickup aperture 9.

On the lower half 3, there are provided substantially circular positioning holes 12a, 12b at the corner portions on one side on the forward stage and the rear stage in the direction of arrow A in FIGS. 3 and 4, which is the direction of insertion to/ejection from the magneto-optical recording/reproducing device, and engaged recess portions 13 formed at the two corner portions on the forward stage by cutting out a part thereof. The positioning hole 12b on the rear stage has a larger diameter than the positioning hole 12a on the forward stage.

On the lower half 3, a plurality of identification holes 14 are provided at the corner portion on the other side on the rear stage in the direction of insertion to/ejection from the recording device, that is, the direction of arrow A in FIGS. 3 and 4. The plurality of identification holes 14 are for identifying the type of the magneto-optical disc 5 housed in the cartridge body 4, for example, for identifying whether writing an information signal onto the magneto-optical disc 5 is possible or not. A save notch 15 is provided at a lateral edge portion on the rear end side corresponding to the identification holes 14. By moving the save notch 15. into the cartridge body 4, the user can change the depth of a part of the plural identification holes 14 and can set whether writing an information signal onto the magneto-optical disc 5 is possible or not.

Moreover, on the lower half 3, a magneto-optical disc identification recess portion 16 is formed by cutting out a part near the positioning hole 12a on the forward stage with a predetermined depth. This magneto-optical disc identification recess portion 16 is to identify whether the housed disc is the magneto-optical disc 5 or not, on the basis of its depth.

Figure 5:
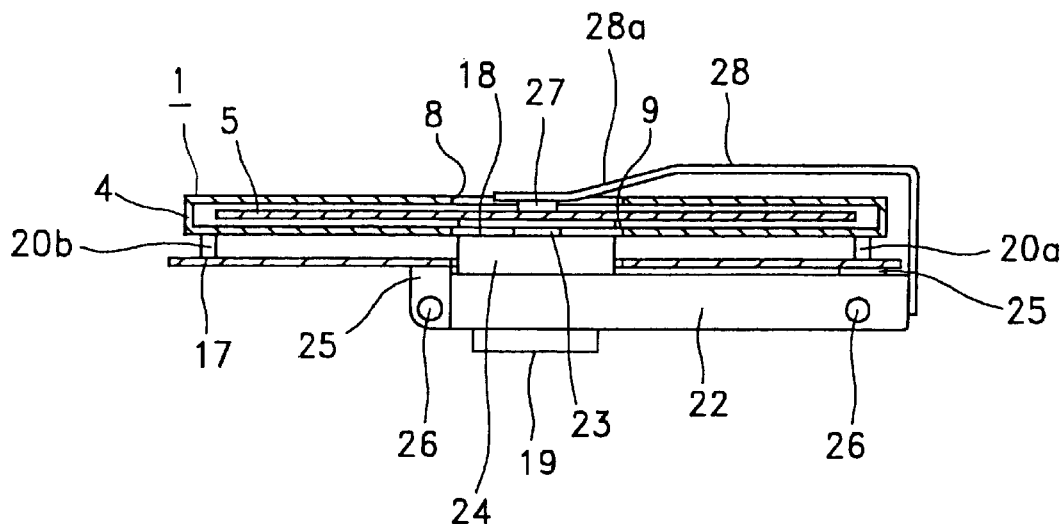
FIG. 5 is a schematic cross-sectional view showing a state such that the disc cartridge is loaded on a chassis within the magneto-optical recording/reproducing device to which the present invention is applied.

When the disc cartridge 1 constituted as described above is inserted in the magneto-optical recording/reproducing device, as shown in FIG. 5, the disc cartridge 1 is position and thus loaded by the engagement of positioning pins provided on a chassis. 17 with the positioning pins 12a, 12b. FIG. 5 is a schematic cross-sectional view showing the state in which the disc cartridge 1 is loaded on the chassis 17 in the magneto-optical recording/reproducing device.

When the disc cartridge 1 is inserted in the magneto-optical recording/reproducing device shown in FIG. 5, the disc cartridge 1 is held by a cartridge holder, not shown. In this case, the shutter member 11 of the disc cartridge 1 is opened by a shutter opening mechanism provided on the cartridge holder and therefore the head aperture 8 and the pickup aperture 9 of the disc cartridge 1 are opened. The disc cartridge 1, held by the cartridge holder, is lowered toward the chassis 17.

When the disc cartridge 1 is lowered toward the chassis 17, the chucking plate 6 of the magneto-optical disc 5 exposed outward from the chucking aperture 7 of the disc cartridge 1 is chucked to a disc table 18 rotatably provided substantially at a central portion on the chassis 17.

The disc table 18 is connected to rotate unitedly with the driving shaft of a spindle motor 19 attached to the chassis 17, and is rotationally driven by the spindle motor 19. At the center of rotation of the disc table 18, a positioning protrusion to be engaged with the center hole of the magneto-optical disc 5 is provided. The positioning protrusion is formed in a substantially conical pedestal-shape so that the center hole of the magneto-optical disc 5 is smoothly engaged with the positioning protrusion. A magnet is provided on the positioning protrusion on the disc table 18. When the center hole of the magneto-optical disc 5 is engaged with the positioning protrusion the magnet magnetically attracts the chucking plate 6 and holds the magneto-optical disc 5 on the disc plate 18. Thus, the magneto-optical disc 5 housed in the disc cartridge body 4 is positioned on the disc table 18 on the chassis 17.

On the chassis 17, positioning pins 20a, 20b to be engaged with the positioning holes 12a, 12b are provided at the positions corresponding positioning holes 12a, 12b of the disc cartridge 1. When the disc cartridge 1 is loaded on the chassis 17, the positioning holes 12a, 12b are engaged with the positioning pins 20a, 20b, and the disc cartridge 1 is thus positioned to the chassis 17.

Figure 6:
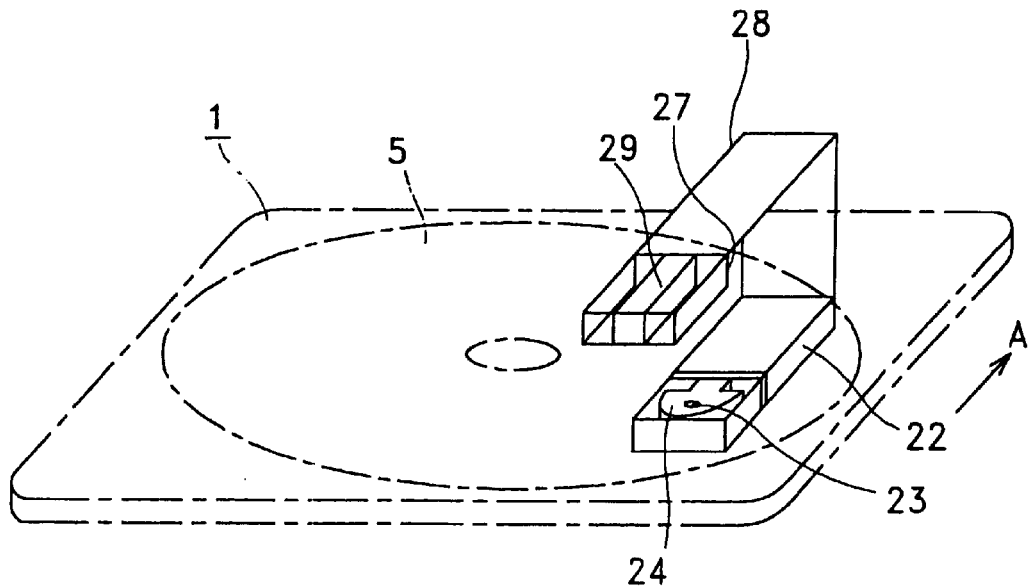
FIG. 6 is a perspective view showing the relation between a magnetic head unit and an optical pickup of the magneto-optical recording/reproducing device.
Figure 7:
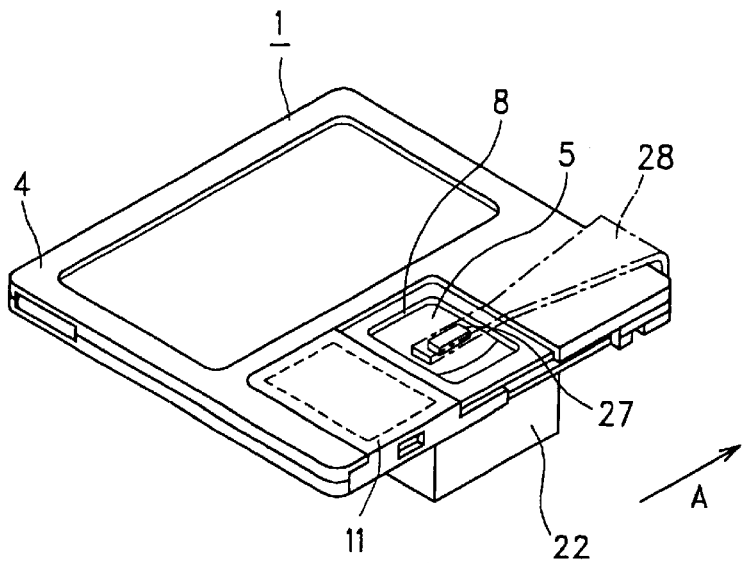
FIG. 7 is a schematic perspective view showing the relation between the disc cartridge, the magnetic head unit, and the optical pickup.

In the magneto-optical recording/reproducing device according to the present invention, an optical pickup unit 22 is arranged to face one side of the magneto-optical disc 5, as shown in FIGS. 5 to 7. The optical pickup unit 22 has an optical block section. In the optical block section, a light source made of a laser diode or the like, various optical devices for leading a laser beam emitted from the light source to an objective lens 23, and a photodetector for detecting a return light from the magneto-optical disc are provided. The optical pickup unit 22 has an actuator for moving the objective lens 23 in a focusing direction and in a tracking direction. The optical pickup unit 22 is supported by a supporting member 25 attached to the chassis 17 via a pair of guide shafts 26 so that the optical pickup unit 22 can move between the inner and outer circles on the magneto-optical disc 5. The optical pickup unit 22 is moved between the inner and outer circles on the magneto-optical disc 5 by a pickup feed motor, not shown, provided on the chassis 17.

In the magneto-optical recording/reproducing device, a magnetic head unit 27 is provided on the side of the other surface of the magneto-optical disc 5. The magnetic head unit 27 is attached to a distal end portion of a supporting arm 28 fixed to the optical pickup unit 22 via a gimbal spring 28a. The magnetic head unit 27 slides in contact with the major surface of the magneto-optical disc 5 and is supported to be movably between the inner and outer circles. The magnetic head unit 27 is provided at the distal end portion of the elastic gimbal spring 28a bent at a predetermined angle and is thus enabled to follow the wavering of the magneto-optical disc 5 in the direction of height.

On the magnetic head unit 27, a magnetic head 29 is attached to face the objective lens 23 of the optical pickup unit 22 situated on the side of one surface of the magneto-optical disc 5.

Figure 8:
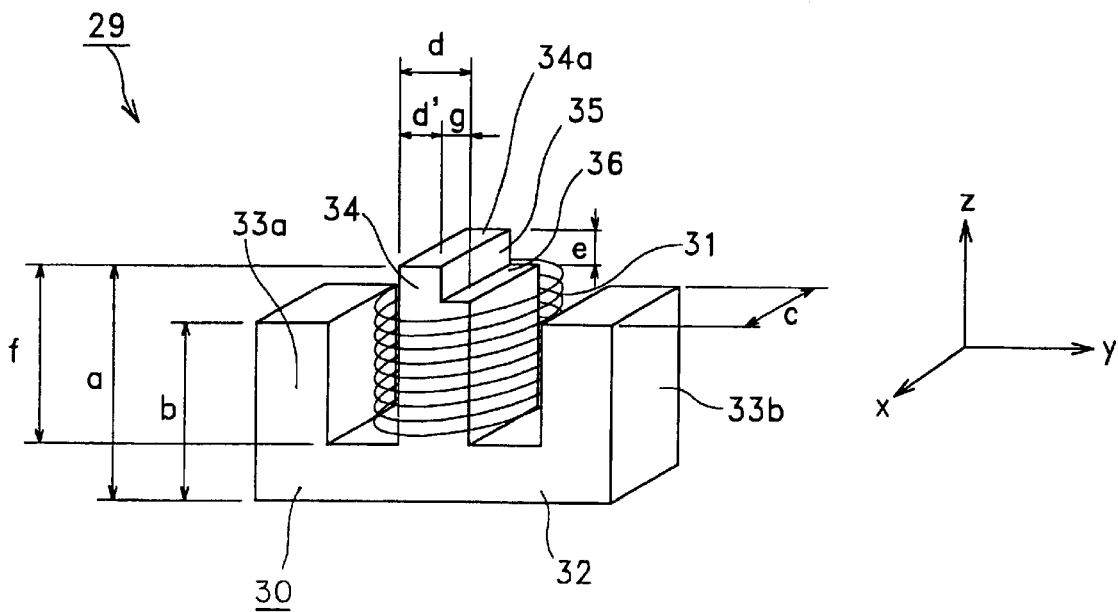
FIG. 8 is a perspective view showing an example of a magnetic head to which the present invention is applied.

The magnetic head 29 is for applying an external magnetic field based on an information signal to the signal recording layer of the magneto-optical disc 5, and has a magnetic core member.30 and a coil 31 for magnetic modulation wound on the magnetic core member 30, as shown in FIG. 8. The magnetic core member 30 is made of a material having a high magnetic permeability and has a substantially prism-shaped base 32, substantially prism-shaped yokes 33a, 33b provided to stand upward from both ends of the base 32, and a substantially prism-shaped magnetic core 34 provided to stand upward from the base 32 at a position between the yokes 33a, 33b.

Of these parts, the magnetic core 34 is formed to be longer than the yokes 33a, 33b, and has a step 35 formed thereon with a predetermined height by cutting out one side of its distal end surface 34a along a direction substantially perpendicular to the recording track on the magneto-optical disc 5. That is, the magnetic core 34 has the step 35 such that the cross-sectional area of a distal end portion is smaller than the cross-sectional area of a proximal end portion 36. The step 35 is formed to stand upward from the proximal end portion 36.

The coil 31 is wound on the outer circumferential surface of the magnetic core 34, over the entire circumference except for the step 35.

In the following description, the feed direction and the moving direction of the magnetic head unit 27, that is, the direction substantially perpendicular to the recording track on the magneto-optical disc 5, is referred to as an x-direction, and the direction substantially parallel to the recording track is referred to as a y-direction. The direction of height of the magnetic core is referred to as a z-direction.

The magnetic core member 30 has the following dimensions. For example, as shown in FIG. 8, the height "a" of the magnetic core 34 including the base 32 is 1.76 mm, and the height "b" of the yokes 33a, 33b including the base 32 is 1.45 mm. The length "c" of the magnetic core member 30 in the x-direction, that is, the length "c" of each of the base 32, the yokes 33a, 33b and the magnetic core 34 in the x-direction, is 0.5 mm, and the length "d" of the proximal end portion 36 of the magnetic core 34. in the y-direction is 0.7 mm. The length d' of the step 35 of the magnetic core 34 in the y-direction is 0.4 mm, and the height "e" of the step 35 of the magnetic core 34 is 0.4 mm.

When a current corresponding to an information signal is supplied to the coil 31, the magnetic head 29 according to the present invention generates a vertical magnetic field modulated on the basis of the information signal to be recorded, from the distal end surface 34a of the magnetic core 34 on which the coil 31 is wound. While causing the distal end surface 34a of the magnetic core 34 to closely contact or slide in contact with the signal recording surface of the magneto-optical disc, the magnetic head 29 applies the vertical magnetic field generated from the distal end surface 34a of the magnetic core 34 to the signal recording layer of the magneto-optical disc 5.

The magneto-optical recording/reproducing device according to the present invention has such a structure that the magnetic head unit 27 slides in contact with the side facing the other surface of the magneto-optical disc 5, as will be described later, and a constant distance is maintained between the distal end surface 34a of the magnetic head 29 and the magneto-optical disc 5.

Since the magnetic core 34 constituting the magnetic head 29 has the step 35 at the distal end portion which is narrower than the proximal end portion 36, the magnetic field to be applied to the signal recording layer of the magneto-optical disc 5 can be concentrated and narrowed down to the distal end surface 34a of the magnetic core 34 and improvement in the generation efficiency of the vertical magnetic field due to a so-called edge effect can be realized.

In the magneto-optical recording/reproducing device constituted as described above, at the time recording, the optical pickup unit 22 and the magnetic head unit 27 cooperate to write an information signal onto the magneto-optical disc 5.

Specifically, in the magneto-optical recording/reproducing device, the optical pickup unit 22 casts a laser beam condensed by the objective lens 23 onto the signal recording layer of the magneto-optical disc 5 and thus locally heats the signal recording layer to the Curie temperature or higher. The magnetic head unit 27 applies, by using the magnetic head 29, an external magnetic field modulated in accordance with an information signal to the part of the signal recording layer that is heated to the Curie temperature or higher, thus writing the information signal. At the part of the signal recording layer that is heated to the Curie temperature or higher, the coercive force is lost and the direction of magnetization is changed in accordance with the external magnetic field supplied from the magnetic head 29.

On the other hand, in the magneto-optical recording/reproducing device, at the time of reproduction, the optical pickup unit 22 casts a weaker laser beam than at the time of recording onto the signal recording layer of the magneto-optical disc 5 and detects the rotation of the plane of polarization of the laser beam corresponding to the direction of magnetization due to a Kerr effect, thus reading out the information signal.

Meanwhile, in the magneto-optical recording/reproducing device to which the present invention is applied, when the magneto-optical disc 5 housed in the cartridge body 4 is positioned on the disc table 18 on the chassis 17, a slight positioning error may occur in the engagement of the positioning protrusion of the disc table 18 with the center hole of the magneto-optical disc 5. This positioning error causes generation of a positional deviation $x_1$ of the magnetic head 29 in the x-direction with respect to the recording track. This positional deviation $x_1$ is approximately 0.1 mm at the maximum.

The optical pickup unit 22 used in the magneto-optical recording/reproducing device to which the present invention is applied, fine adjustment of the position of the objective lens 23 is made by the actuator 24. Specifically, the optical pickup unit 22 follows the positional variance of the recording track of the rotating magneto-optical disc 5 while having the objective lens 23 controlled by the actuator 24. Thus, the spot position of the laser beam is adjusted to be constantly on the recording track. The positional variance of the objective lens 23 by the actuator 24 causes generation of a positional deviation $x_3$ of the magnetic head 29 in the x-direction with respect to the recording track. In this case, the positional deviation $x_3$ is the variance range in the adjustment of the objective lens 23. The positional deviation $x_3$ is approximately 0.14 mm at the maximum.

Therefore, the positional deviation of the magnetic head 29 in the x-direction with respect to the recording track is approximately 0.32 mm, that is, $x_1+x_2+x_3=0.1+0.08+0.14$.

The magnetic head unit 27 follows the positional variance in the direction of the height with respect to the magneto-optical disc 5 while being supported by the gimbal spring 28a of the supporting arm 28. At the same time, the magnetic head unit 27 causes a positional deviation of the magnetic head 29 in the y-direction with respect to the recording track.

Figure 9:
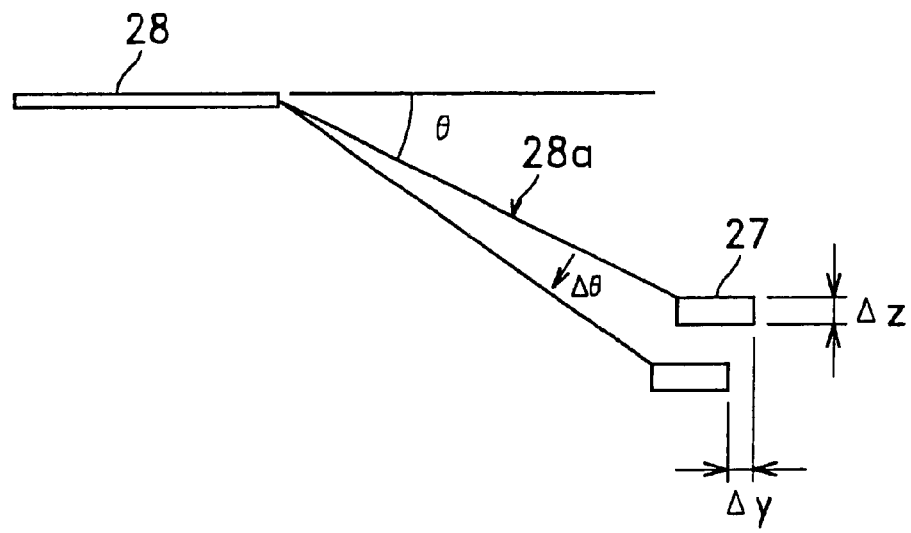
FIGS. 9 and 10 are schematic views showing the positional relation between a magnetic head unit having the magnetic head according to the present invention and a magneto-optical disc before and after the following by the magnetic head unit.

The positional relation between the magnetic head unit 27 and the magneto-optical disc 5 before and after the following by the magnetic head unit 27 is shown in FIG. 9.

As shown in FIG. 9, the magnetic head unit 27 is attached to the distal end portion of the supporting arm 28 via the gimbal spring 28a, and the gimbal spring 28a is inclined by a predetermined angle θ with respect to the horizontal direction of the supporting arm 28. When a positional variance Δz in the direction of height with respect to the magneto-optical disc 5 is generated, the magnetic head unit 27 is caused to keep the positional relation with the magneto-optical disc 5, with the gimbal spring 28a inclined by an angle Δθ. Along with this, the magnetic head device 27 causes a positional deviation Δy of the magnetic head 29 in the y-direction with respect to the recording track.

Figure 10:
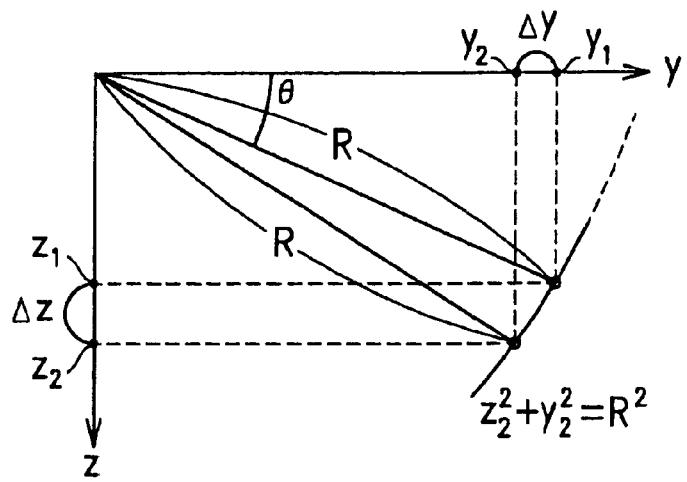

The positional relation between the magnetic head unit 27 and the magneto-optical disc 5 before and after the following by the magnetic head unit 27 is schematically shown in FIG. 10. In FIG. 10, the length of the gimbal spring 28a is expressed by R, the position of the magnetic head unit 27 before the variance is expressed by $(z_1, y_1)$, and the position after the variance is expressed by $(z_2, y_2)$.

As seen from FIG. 10, the position of the magnetic head unit 27 before the variance can be expressed by $(z_1, y_1)=(R\sin\theta, R\cos\theta)$, and the position after the variance can be expressed by $(z_2, y_2)=(R\sin\theta+\Delta z, R\cos\theta+\Delta y)$.

The relation of $R^2=(z_2{}^2, y_2{}^2)=(R\cos\theta+\Delta y)^2+(R\sin\theta+\Delta z)^2$ is set up.

The actual length of the gimbal spring 28a is approximately 20 mm and the angle θ of the gimbal spring is approximately 15°. The positional variance Δz of the magnetic head unit 27 in the direction of height with respect to the magneto-optical disc 5 is approximately 0.8 mm. By entering these values into the above relational expression, the positional deviation Δy in the y-direction can be found. As a result of calculation, Δy=−0.23 mm is obtained. Therefore, the positional deviation of the magnetic head 29 in the y-direction with respect to the recording track is approximately 0.23 mm.

In the magneto-optical recording/reproducing device, a positional deviation of the magnetic head 29 in the y-direction with respect to the recording track might be generated by a temperature change because of the difference in the coefficient of thermal expansion between the material of the casing of the optical pickup unit 22 on which the supporting arm 28 is fixed and the material of the supporting arm 28. If the temperature change is approximately 45° C. at the maximum, the positional deviation in the y-direction is approximately 0.03 mm at the maximum.

Therefore, the positional deviation of the magnetic head 29 in the y-direction with respect to the recording track is approximately 0.23+0.03=0.26 mm.

Figure 1:
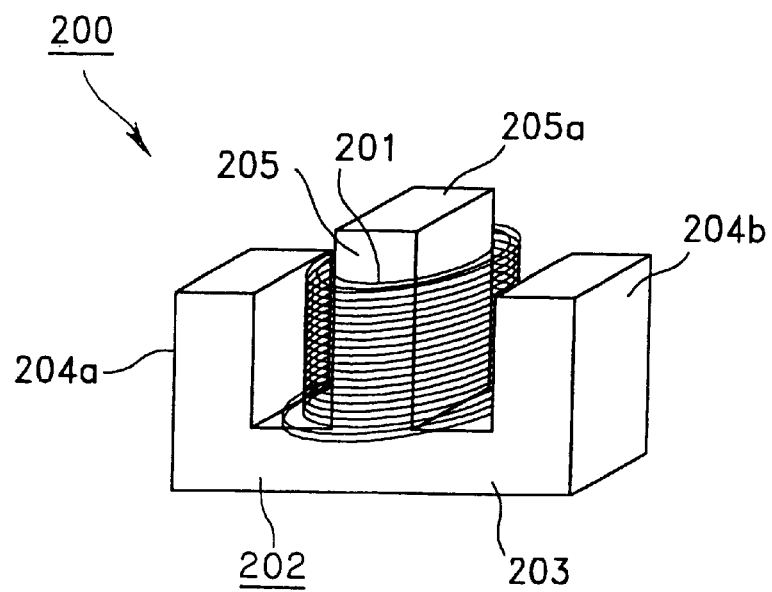
FIG. 1 is a perspective view showing an example of a conventional magnetic head.
Figure 2:
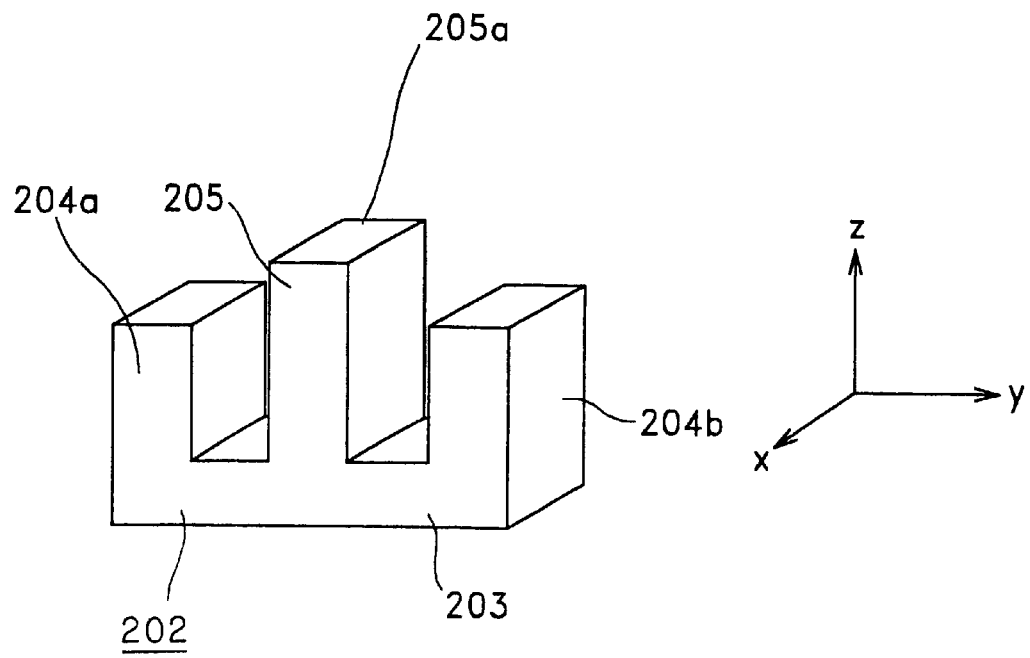
FIG. 2 is a perspective view showing the structure of a magnetic core member of the conventional magnetic head.

Meanwhile, in the magneto-optical recording/reproducing device which aims at recording/reproduction of music data as in the conventional technique, since the data transfer rate and the magnetic field inversion band may be low, a magnetic field can be generated with relatively low power even when the magnetic head 200 is used in which the distal end portion 205a of the magnetic core 205 has a large area as shown in FIG. 1 and which has large inductance.

In the case where high speed data recording of computer data or image data is carried out, unlike the case of music data, a high magnetic field inversion range is required. Therefore, a magnetic head with high efficiency and low dissipation power is desired. In view of the dissipation power, a magnetic head with small inductance, that is, a magnetic head in which the distal end surface of a magnetic core in close contact with or abutted against a recording medium has a small area, is effective. By reducing the area of the distal end surface of the magnetic core, a magnetic field concentrates at the edge portion of the distal end surface and improvement in the generation efficiency of the magnetic field due to a so-called edge effect can be realized.

If the distal end portion 205a of the magnetic core 205 is narrowed as in the conventional technique, the cross-sectional area of the distal end portion 205a is reduced and the range where an effective magnetic field can be obtained is reduced, too. Therefore, it is very difficult to carry out appropriate write operation to the magneto-optical recording medium. The minimum value of the area of the distal end surface is obtained by adding the positional deviations in the x-direction and the y-direction. when attaching the magnetic head unit 27 to the optical pickup unit 29 via the supporting arm 28 and their changes with the lapse of time, to values in consideration of the positional deviation of approximately 0.26 mm of the magnetic head 29 in the x-direction with respect to the recording track and the positional deviation of approximately 0.32 mm of the magnetic head 29 in the y-direction with respect to the recording track, which are calculated before.

Specifically, the range where a sufficient magnetic field for stable recording operation can be provided in the magnetic head 29 is substantially equal to the range of the distal end surface 34a of the magnetic core 34 which closely contacts or slides in contact with the magneto-optical disc 5. By setting the area of the distal end surface 34a of the magnetic core 34 to be substantially equal to the range of the above-described positional deviations in the x-direction and y-direction with respect to the magneto-optical disc 5, the influence of such positional deviations can be avoided. If such positional deviations and their changes with the lapse of time are restrained to 0.05 mm or less, the length "c" of the step 35 of the magnetic core 34 in the x-direction is approximately 0.3 mm and the length d' in the y-direction is approximately 0.4 mm.

It is not easy to restrain such positional deviations and their changes with the lapse of time. If the conventional structure with restrained cost is used as the basis, the positional deviations and their changes with the lapse of time need to be approximately 0.2 mm. In such a case, the length "c" of the step 35 of the magnetic core 34 in the x-direction is approximately 0.45 mm and the length d' in the y-direction is approximately 0.55 mm.

In view of the above, in the magnetic head 29 according to the present invention, power saving and reduction in cost can be realized by setting the length "c" of the step 35 of the magnetic core 34 in the x-direction to be not less than 0.3 mm and not more than 0.45 mm, and setting the length d' in the y-direction to be not less than 0.4 mm and not more than 0.55 mm. Thus, a magnetic head for high-speed recording to cope with a higher transfer rate can be realized.

In the conventional magnetic head 200, if the distal end portion 205a of the magnetic core 205 is narrowed, the heat generated in the magnetic head member 204 concentrates at the magnetic core 205 and deterioration due to the high temperature occurs, making it difficult to generate a sufficient magnetic field.

On the contrary, in the magnetic head 29 according to the present invention, the distal end portion is cut-out to form the step 35 and the cross-sectional area of the distal end portion is made smaller than the cross-sectional area on the side of the proximal end portion 36, as shown in FIG. 8. In the magnetic head 29 formed in this manner, the heat generated in the magnetic core 34 can be efficiently released from the distal end portion side toward the proximal end portion 36. Thus, the magnetic field generation efficiency of the magnetic core 34 can be improved and the heat generated in the magnetic core 34 can be efficiently released toward the base 32 and the yokes 33a, 33b of the magnetic core member 30.

Figure 11:
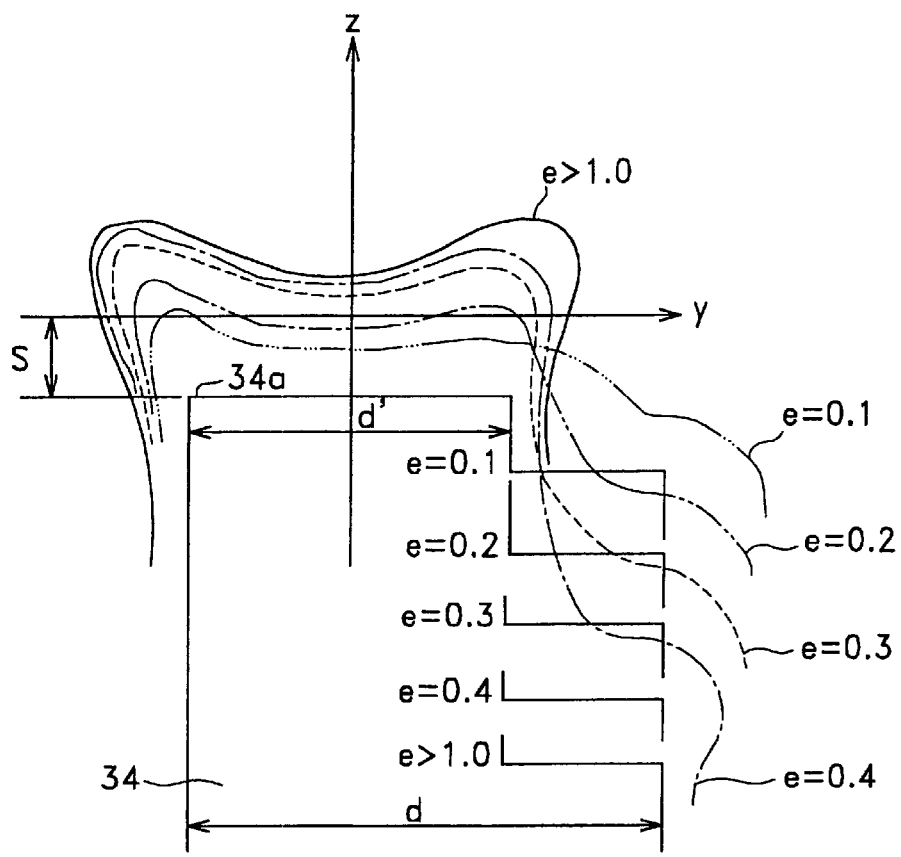
FIG. 11 is an enlarged view showing essential portions of a distal end portion of the magnetic head according to the present invention, as viewed from the x-direction.

If the height "e" of the step 35 formed at the distal end portion of the magnetic core 34 is too low, it adversely affects the distribution of magnetic field. If the height "e" is too high, it adversely affects the radiation effect. Thus, the influence of the height "e" of the step 35 on the distribution of magnetic field is measured. The result of the measurement is shown in FIG. 11. FIG. 11 is an enlarged view showing essential portions of the distal end portion of the magnetic head 29, as viewed from the x-direction. FIG. 11 shows the contour line of the magnitude of a magnetic field generated when the same current is caused to flow in recording, with the height "e" of the step 35 varied. The magnitude of the magnetic field expressed by the contour line is a limit value of an effective external magnetic field in recording. In FIG. 11, S indicates an average gap between the magneto-optical disc 5 and the magnetic head 29, which is approximately 0.1 mm.

As shown in FIG. 11, the contour line for e>1.0 shows that the step 35 has a sufficient height and that the distribution of magnetic field is large on both edge of the distal end surface 34a because of an edge effect. The contour line is substantially symmetrical with respect to the centerline of the magnetic core 34 and shows similar distribution of magnetic field in the x-direction.

The contour line for e=0.4 and the contour line for e=0.3 show that though the width of an external magnetic field is smaller than in the case of e>1.0 because of the intake of the magnetic field by edges f1, f2 of the proximal end portion 36, a practically sufficient width is still obtained.

On the other hand, the contour line for e=0.2 and the contour line for e=0.1 show that the magnetic field taken in by edges f3, f4 of the proximal end portion 36 is too large and that the effective external magnetic field from the distal end surface 34a in recording is insufficient. In such cases, it is difficult to apply an appropriate external magnetic field to the signal recording layer of the magneto-optical disc 5.

Thus, it is clear that the height "e" of the step 35 must be at least 0.3 mm or larger. If the radiation effect of the magnetic core 34 is considered, it is experimentally clear that the height "e" of the step 35 may be half the length f of the magnetic core 34 or less.

Therefore, in the magnetic head 29, by setting the height "e" of the step 35 of the magnetic core 34 to be not less than 0.3 mm and not more than a half of the length f of the magnetic core 34, the heat generated in the magnetic core can be efficiently released toward the base 32 and the yokes 33a, 33b of the magnetic core member 30 while the magnetic field generation efficiency of the magnetic core 34 is improved.

It is desired that the cut-out width "g" in cutting out the distal end surface 34a of the magnetic core 34 is not more than 0.2 mm.

In the magnetic head 29 according to the present invention, the step 35 as shown in FIG. 8 is formed by cutting out one side of the distal end surface 34a of the magnetic core 34 over the x-direction. However, the present invention is not necessarily limited to such a structure.

Figure 12:
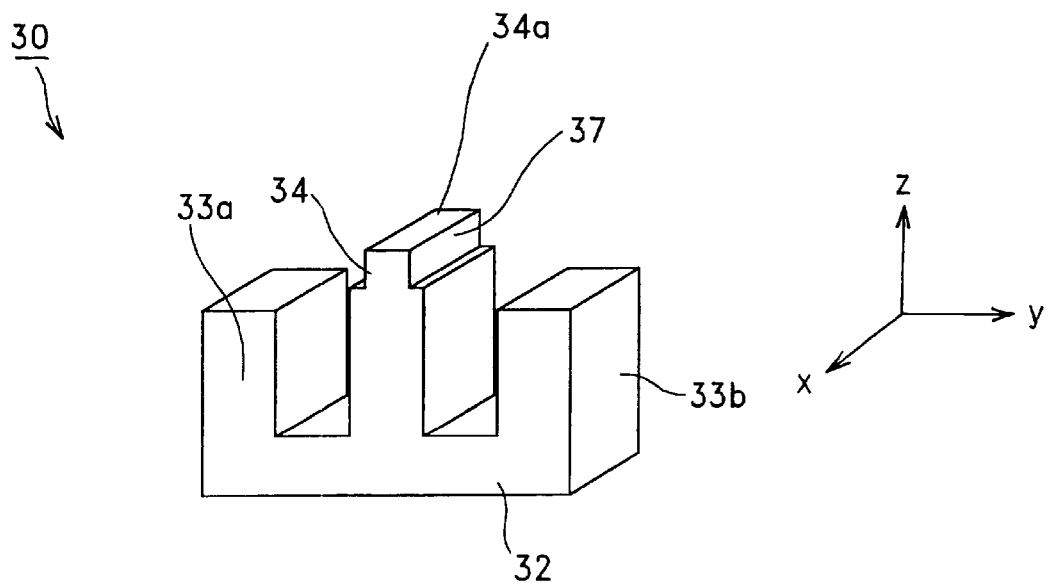
FIG. 12 is a perspective view showing another example of the magnetic head according to the present invention.
Figure 13:
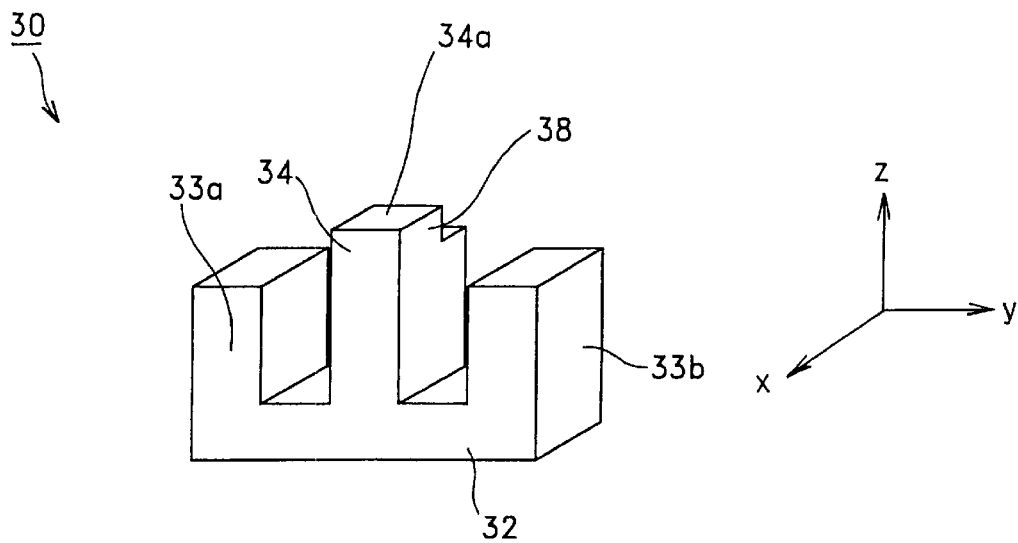
FIG. 13 is a perspective view showing still another example of the magnetic head according to the present invention.
Figure 14:
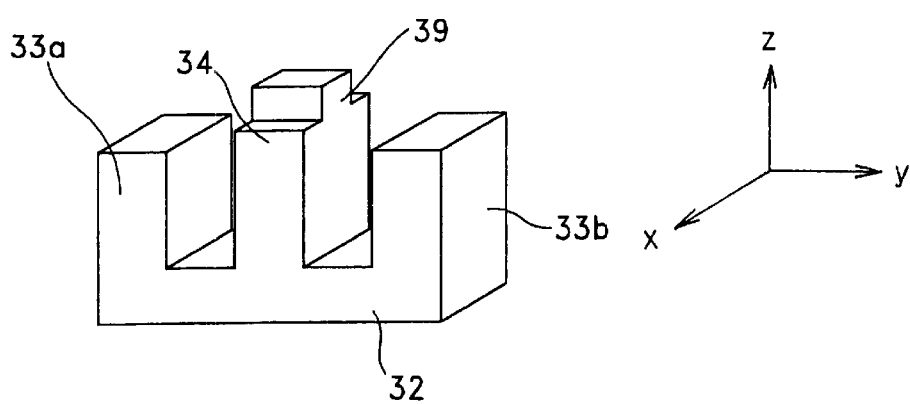
FIG. 14 is a perspective view showing still another example of the magnetic head according to the present invention.
Figure 15:
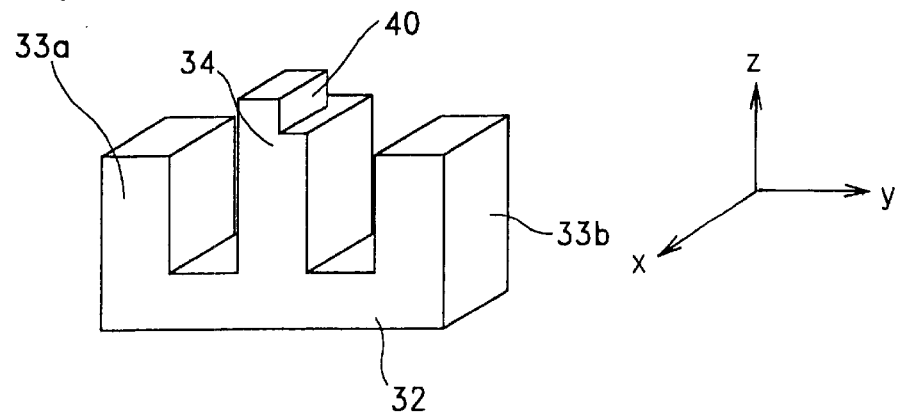
FIG. 15 is a perspective view showing still another example of the magnetic head according to the present invention.

For example, a step 37 as shown in FIG. 12 may be formed on the magnetic core 34 by cutting out both sides of the distal end surface in the x-direction. Similarly, a step 38 as shown in FIG. 13 may be formed in the magnetic core 34 by cutting out one side of the distal end surface 34a in the y-direction, or a step 39 as shown in FIG. 14 may be formed in the magnetic core 34 by cutting out both sides of the distal end surface 34a in the y-direction. Alternatively, a step 40 as shown in FIG. 15 may be formed by cutting out the distal end surface 34a in the x-direction and the y-direction. In FIGS. 12 to 15, the portions equivalent to those of the magnetic core member 30 shown in FIG. 8 are denoted by the same numerals and will not be described further in detail.

An example of a magnetic head unit on which a magnetic head according to the present invention is loaded will now be described.

Figure 16:
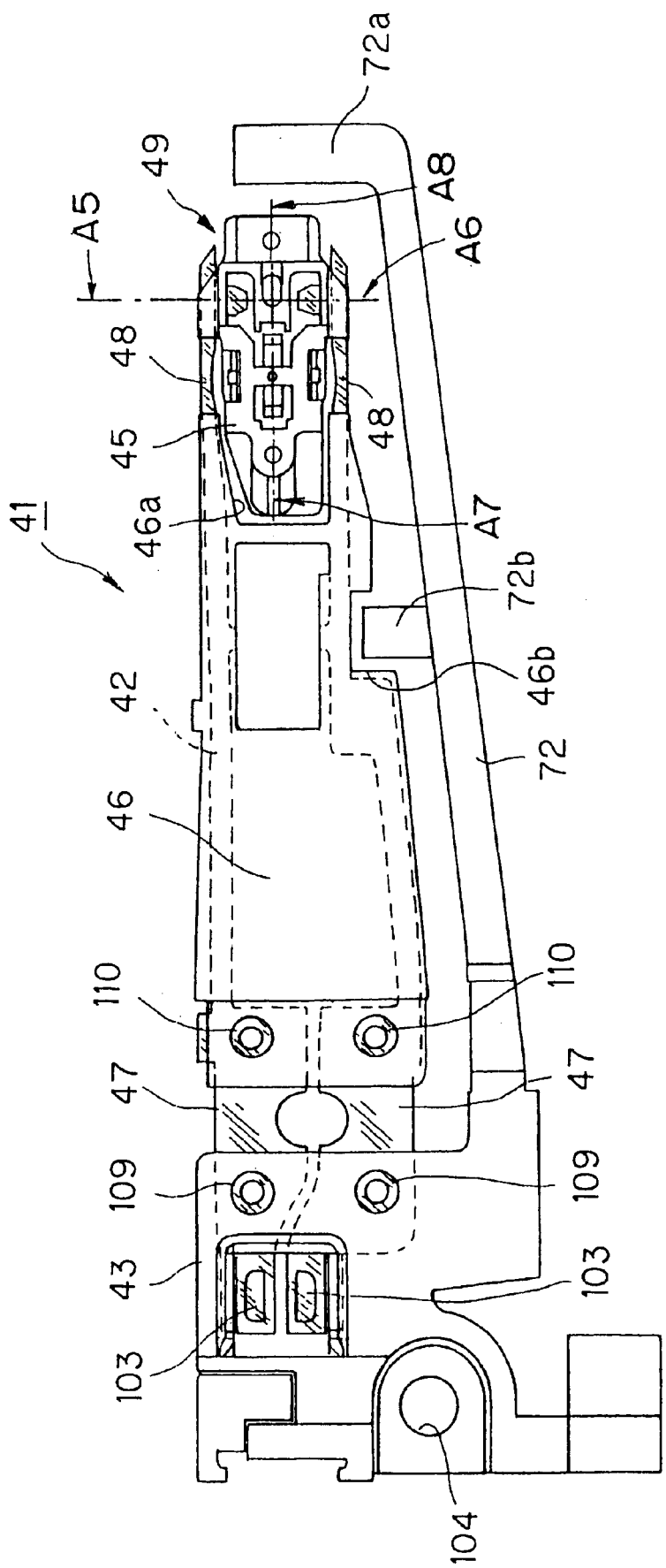
FIG. 16 is a plan view showing an example of a magnetic head unit having the magnetic head according to the present invention.
Figure 17:
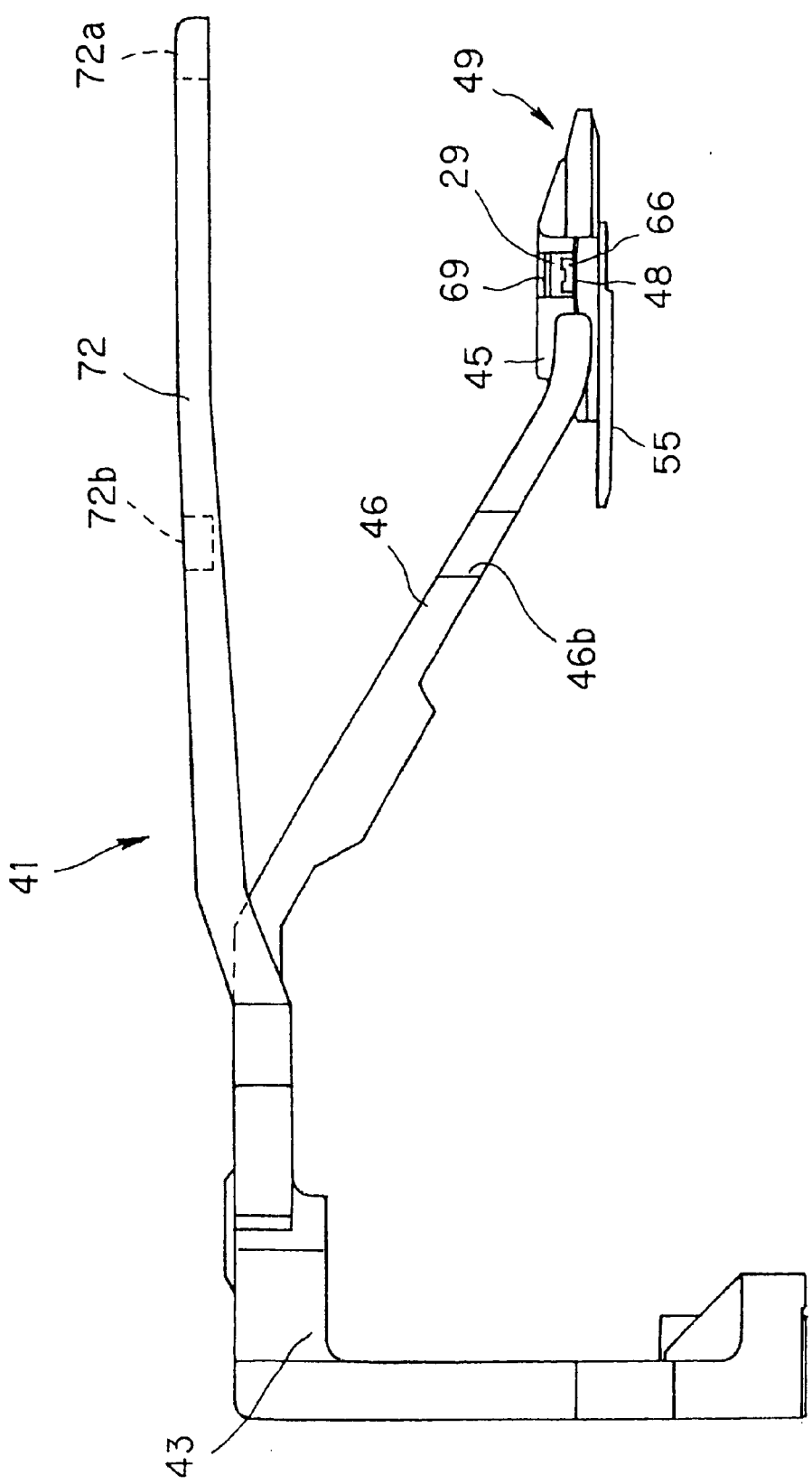
FIG. 17 is a side view thereof.

This magnetic head unit 41 has a pair of long elastic conductive members 42 arranged substantially in parallel with each other, as shown in FIGS. 16 and 17. These conductive members 42 are formed by punching out a conductive thin metal plate of phosphor bronze, BeCu or the like. It is particularly desired that the conductive members 42 are made of an age-hardening material such as BeCu, the hardening degree of which changes depending upon the time of heat treatment. By using the age-hardening material to form the conductive members 42, desired elastic forces of the conductive members 42 can be obtained easily.

At the distal end portions of the conductive members 42, feeding terminals are provided which are electrically connected with a coil of a magnetic head 44 attached to a head attaching portion 45, as will be described later. At the proximal end portions thereof, terminal portions are provided which constitute an external circuit connecting portion connected with a flexible wiring board for feeding the coil of the magnetic head 44, as will be described later.

On the side of the proximal ends of the pair of conductive members 42, a fixed portion 43 for attaching the magnetic head unit 41 to an attachment base to be arranged inside the magneto-optical recording/reproducing device is integrally provided by molding a synthetic resin material. On the side of the distal ends of the pair of conductive members 42, a head attaching portion 45 to which the magnetic head 44 made of a magnetic core member, a coil and the like is attached to constitute a magnetic head portion 49 is integrally provided by molding a synthetic resin material. Between the proximal end portions of the pair of conductive members 42 where the fixed portion 43 is provided and the distal end portions of the conductive members 42 where the head attaching portion 45 is provided, a head support 46 is integrally provided by molding a synthetic resin material.

This magnetic head unit 41 has the conductive members 42 connected to the coil of the magnetic head 44, and also has the fixed portion 43, the head attaching portion 45 and the head support 46 as the supporting member integrally formed with the conductive members 42. The proximal end side of the supporting member, that is, the fixed portion 43, is fixed on the attachment base to be arranged inside the magneto-optical recording/reproducing device, and the magnetic head 44 constituted similarly to the above-described magnetic head 29 is arranged on the distal end side of the supporting member, that is, on the head attaching portion 45.

The head support 46 is integrally provided at a halfway part of the pair of conductive members 42 so as to expose a part of the pair of conductive members 42 outward between the fixed portion 43 and the head support 46 and to expose a part of the pair of conductive members 42 outward between the head attaching portion 45 and the head support 46. The parts of the pair of conductive members 42 exposed outward between the fixed portion 43 and the head support 46 are first elastic displacement portions 47 as the center of fluctuation in the case where the head attaching portion 45 and the bead support 46 fluctuate in the directions toward and away from the magneto-optical disc. The parts of the pair of conductive members 42 exposed outward between the head attaching portion 45 and the head support 46 are second elastic displacement portions 48 which are displaced in the opposite direction of the direction of the displacement of the first elastic displacement portions 47 so as to maintain predetermined attitudes of the head attaching portion 45, the magnetic head 44 attached thereto, and a sliding contact portion 55, which will be described later, when the head attaching portion 45 and the head support 46 are moved and displaced in the directions toward and away from the magneto-optical disc.

In the magnetic head unit 41, a fluctuation quantity regulating arm 72 for regulating the quantity of fluctuation when the head attaching portion 45 and the head support 46 fluctuate in the direction away from the magneto-optical disc is formed to protrude from the fixed portion 43 toward the head support 46 and the head attaching portion 45. In the magnetic head unit 41, the fluctuation quantity regulating arm 72 regulates the quantity of fluctuation of the head attaching portion 45 and the head support 46, and determines the height position when the head attaching portion 45 is pushed up.

In the magnetic head unit 41, the head attaching portion 45, the head support 46, the fixed portion 43 and the fluctuation quantity regulating arm 72 are arranged so that these members do not overlap each other when projected on a plan view, as shown in FIG. 16. By arranging the respective members in this manner, it is possible to mold the magnetic head unit 41 in a single molding operation with a pair of upper and lower metal molds.

The respective parts constituting the magnetic head unit 41 will now be described in detail.

First, the head attaching portion 45 integrally provided on the distal end side of the pair of conductive members 42, and the magnetic head 44 attached to the head attaching portion 45 will be described.

The magnetic head 44 having a magnetic core member and a coil is attached to the head attaching portion 45, thus constituting the magnetic head portion 49. In recording an information signal onto a magneto-optical disc, the magnetic head unit 41 slides in contact with one major surface of the rotated magneto-optical disc and maintains the magnetic core member constituting the magnetic head 44 at a constant distance from the signal recording layer of the magneto-optical disc.

Figure 18:
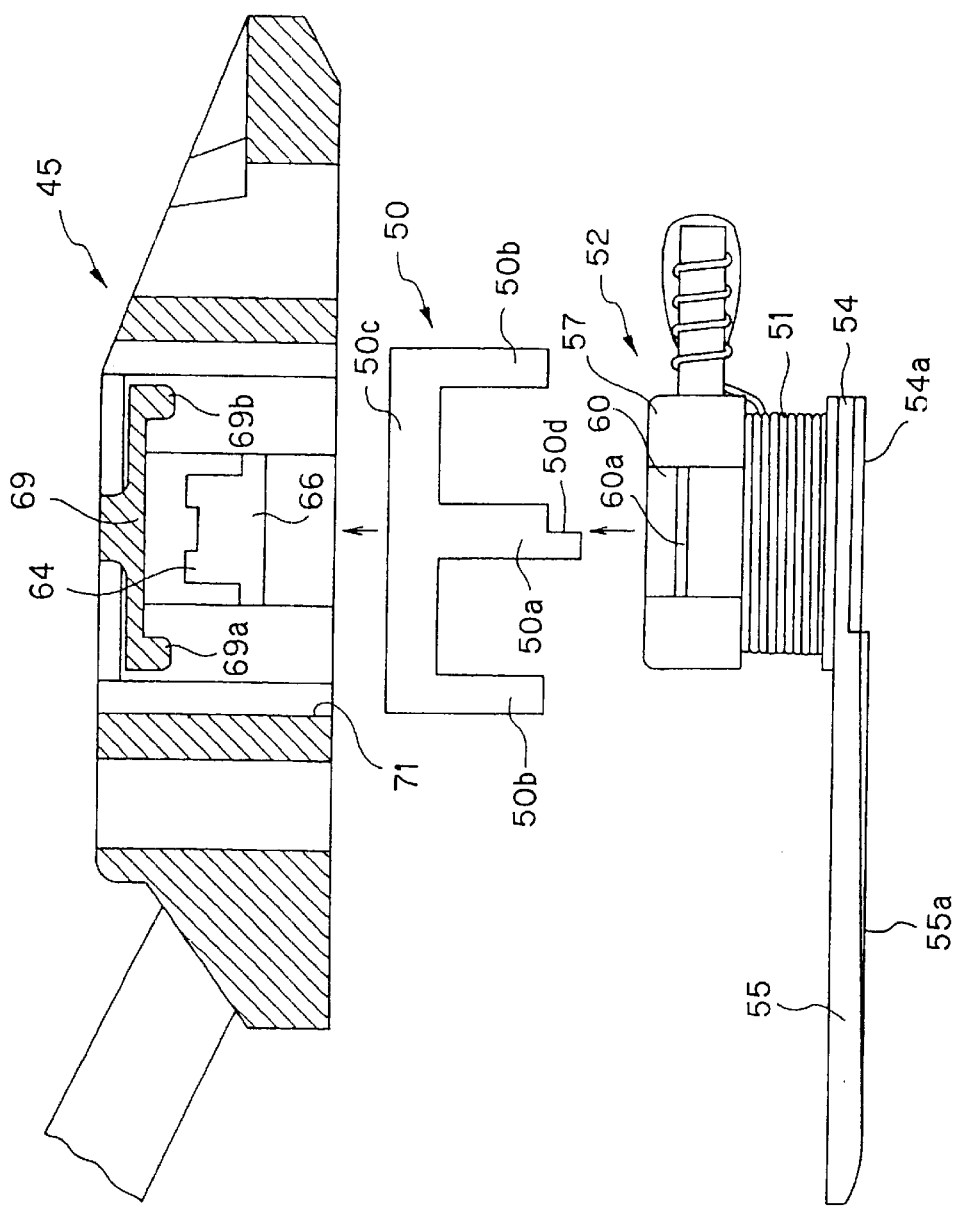
FIG. 18 is an exploded side cross-sectional view showing a magnetic head portion constituting the magnetic head unit.
Figure 19:
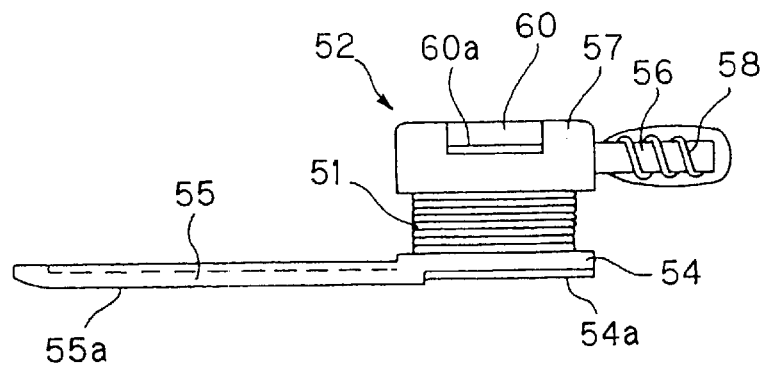
FIG. 19 is a side view showing a bobbin and a coil.

The magnetic head 44 attached to the head attaching portion 45 to constitute the magnetic head portion 49 is the above-described magnetic head to which the present invention is applied. The magnetic head 44 is constituted by a magnetic core member 50 made of a magnetic material such as ferrite and a bobbin 52 on which a coil 51 is wound, as shown in FIG. 18. The magnetic core member 50 has a magnetic core 50a, a pair of yokes 50b provided on both sides of the magnetic core 50a, and a base 50c connecting the proximal ends of the magnetic core 50a and the pair of yokes 50b, and is formed substantially in an E-shape as a whole.

The magnetic core 50a of the magnetic core member 50 is formed to be longer than the yokes 50b, and a step 50d having a predetermined height is formed by cutting out a part of the distal end surface of the magnetic core 50a. That is, the magnetic core 50a has the step 50d such that the cross-sectional area of the distal end portion is smaller than the cross-sectional area of the proximal end portion, and this step 50d is formed to stand upward from the proximal end portion.

The bobbin 52 constituting the magnetic head 44 together with the magnetic core member 50 is formed by molding a synthetic resin material such as liquid crystal polymer, polyphenylene sulfide or the like, which can be molded with extremely high accuracy. The bobbin 52 has at its central part a magnetic core insertion hole 53 in which the magnetic core 50a of the magnetic core member 50 is inserted, and a coil winding portion formed in a recessed shape is provided to surround the magnetic core insertion hole 53, as shown in FIGS. 18, 19, 20 and 21. On one end side of the bobbin 52, a flange portion 54 protruding in a direction orthogonal to the axial direction of the magnetic core insertion hole 53 is integrally formed. A lower surface 54a of the flange portion 54 is a surface facing the major surface of the magneto-optical disc.

Figure 20:
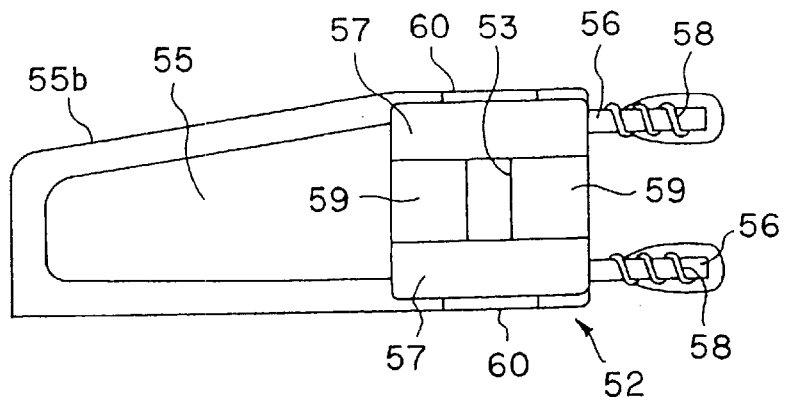
FIG. 20 is a plan view thereof.
Figure 21:
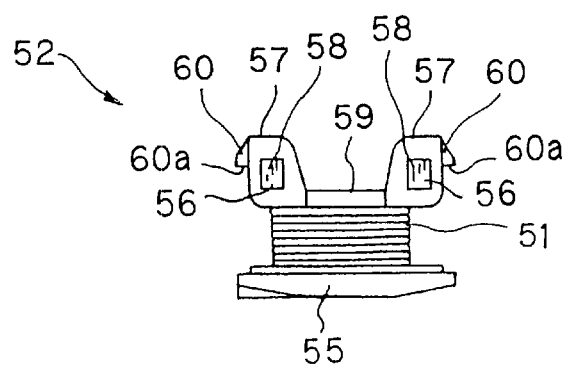
FIG. 21 is a front view thereof.

A sliding contact portion 55 which slides in contact with the major surface of the magneto-optical disc is provided to protrude from one end of the flange portion 54 toward the fixed portion 43 of the supporting member. A sliding contact surface 55a of the sliding contact portion 55 is formed to protrude a little more than the surface 54a of the flange portion 54 facing the major surface of the magneto-optical disc, and thus slides in contact with the major surface of the magneto-optical disc, as shown in FIG. 20. That is, the bobbin 52 has a step between the surface 54a facing the major surface of the magneto-optical disc near the magnetic core insertion hole 53 and the surface facing the major surface of the magneto-optical disc on the sliding contact surface 55a of the sliding contact portion 55. When the sliding contact portion 55 slides in contact with the magneto-optical disc, a predetermined gap is formed between the portion near the magnetic core insertion hole 53 and the magneto-optical disc.

A side of the sliding contact portion 55 that is situated on the outer circumference of the magneto-optical disc when the magnetic head portion 49 is caused to slide in contact with the magneto-optical disc is an inclined portion 55b along the outer circumference of the magneto-optical disc, as shown in FIG. 20. Thus, when the magnetic head portion 49 slides and moves in contact with the rotated magneto-optical disc, the sliding contact surface 55a of the sliding contact portion 55 smoothly slide in contact with the entire surface of the magneto-optical disc including the portion near the outer circumference.

On the other end side of the bobbin 52, a pair of terminal supporting portions 57 for supporting a pair of coil connection terminals 56 made of a conductive material such as phosphor bronze or the like are provided to protrude. These terminal supporting portions 57 are provided to protrude in parallel, facing each other in the direction orthogonal to the axial direction of the magnetic core insertion hole 53. The end portions on one side of the terminal supporting portions 57 are caused to protrude and the pair of coil connection terminals 56 are integrally mounted so that the coil connection terminals 56 are buried in the terminal supporting portions 57. That is, the coil connection terminals 56 are mounted on the terminal supporting portions 57 by so-called insertion molding.

Connection terminals 58 of the coil 51 wound on the bobbin 52 are wound on the coil connection terminals 56 several times and are electrically connected with the coil connection terminals 56. To realize secure electrical connection of the connection terminals 58 of the coil 51 with the coil connection terminals 56, the connection terminals 58 are connected with the coil connection terminals 56 by using a conductive adhesive or solder.

Two recessed portions 59 formed in the bobbin 52 by providing the pair of terminal supporting portions 57 to protrude to face each other are fitting portions of the magnetic core member 50.

On one side of the upper ends of the terminal supporting portions 57, engagement pawl portions 60 are provided which engaging portions to be relatively engaged with engagement step portions as engaged portions provided in an attachment hole provided in the head attaching portion 45 when the bobbin 52 is fitted in the attachment hole. The engagement pawl portions 60 are extended in the axial direction of the magnetic core insertion hole 53 provided in the bobbin 52, and engagement pawls 60a are provided to protrude on one side of their distal ends.

The head attaching portion 45, to which the magnetic core member 50 and the bobbin 52 constituting the magnetic head 44 are attached, is formed by molding a non-conductive synthetic resin material and the magnetic head 44 is attached to its central part, as shown in FIGS. 18, 22, 23, 24 and 25.

An attachment hole 61 is formed in the head attaching portion 45 so that the magnetic core member 50 and the bobbin 52 are fitted in the attachment hole 61. This attachment hole 61 is formed in the shape of a bottomed recess in which a side facing the magneto-optical disc is an aperture. On the sides facing each other in the longitudinal direction of the attachment hole 61, first holding pieces 62 and second holding pieces 63 for pinching and holding the yokes 50b provided on both sides of the magnetic core member 50 inserted into the attachment hole 61 are provided to protrude. These first holding pieces 62 and second holding pieces 63 are provided to protrude from the surfaces facing each other in the longitudinal direction of the attachment hole 61 so that the holding pieces face each other. The spacing between the first holding pieces 62 and the spacing between the second holding pieces 63 are slightly smaller than the thickness of the magnetic core member 50, and the first holding pieces 62 and the second holding pieces 63 pinch and hold, by compression bonding, the yokes 50b of the magnetic core member 50 inserted in the attachment hole 61.

On both lateral sides of the attachment hole 61, engagement step portions 64 are provided which are engaged portions to be relatively engaged with the engagement pawls 60a of the engagement pawl portions 60 provided on the bobbin 52 inserted in the attachment hole 61. The engagement step portions 64 are formed at distal end surfaces of elastic displacement pieces 66 formed by providing substantially U-shaped cut-in grooves 65 on the surfaces facing each other in the longitudinal direction of the attachment hole 61, from the side to be the bottom side of the attachment hole 61, that is, from the upper side of the head attaching portion 45. That is, the engagement step portions 64 are formed by the cut-in grooves 65 provided on the surfaces facing each other in the longitudinal direction of the attachment hole 61, and are constituted by parts of the elastic displacement pieces 66.

On the upper surface of each engagement step portion 64 constituted by a part of the elastic displacement piece 66, that is, on the surface relatively engaged with the engagement pawl 60a formed on the bobbin 52, a protruding portion 64a is formed at one end and a similar protruding portion 64b is formed at the other end. The upper surfaces of the protruding portions 64a, 64b are flat surfaces, and the engagement pawl 60a to be engaged with the engagement step portion 64 is abutted against the engagement step portion 64 on the upper surfaces of the protruding portions 64a, 64b.

By thus providing the two protruding portions 64a, 64b on the upper surface of the engagement step portion 64, the bobbin 52 can be easily made parallel to the head attaching portion 45 with high accuracy.

To form the engagement step portions 64, the upper ends of the elastic displacement pieces 66 on which the engagement step portions 64 are formed by providing the cut-in grooves 65 are inclined to protrude inside the attachment hole 61. The inclined surfaces facing each other of the elastic displacement pieces 66 are insertion guide portions 67 which are abutted against parts of the outer circumferential portion of the bobbin 52 inserted in the attachment hole 61 so as to guide the direction of insertion and the position of insertion of the bobbin 52.

Figure 22:
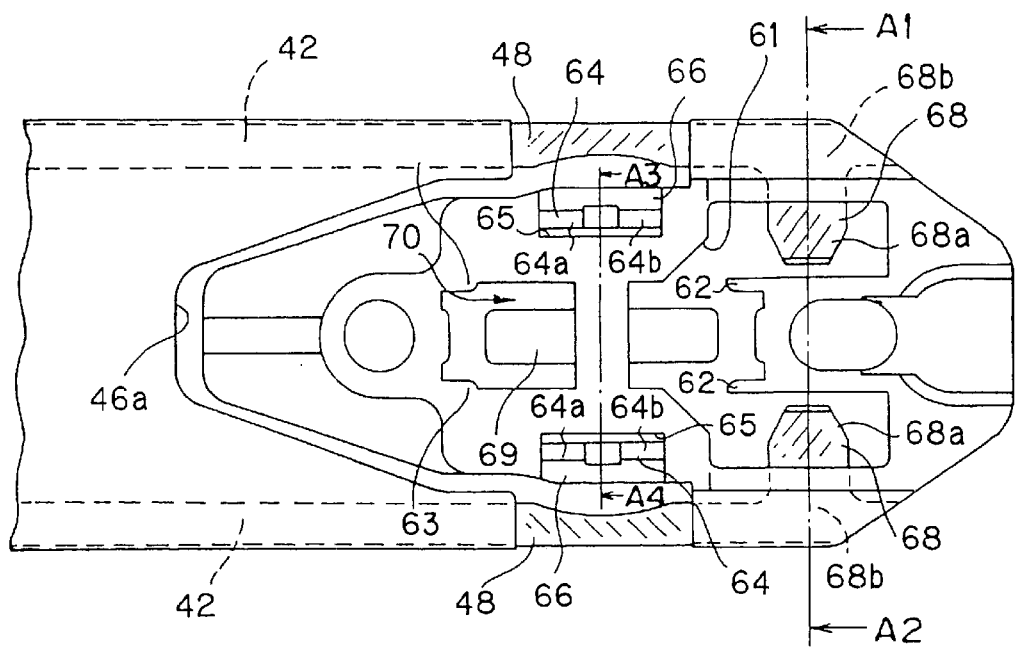
FIG. 22 is a plan view showing a head attaching portion.
Figure 23:
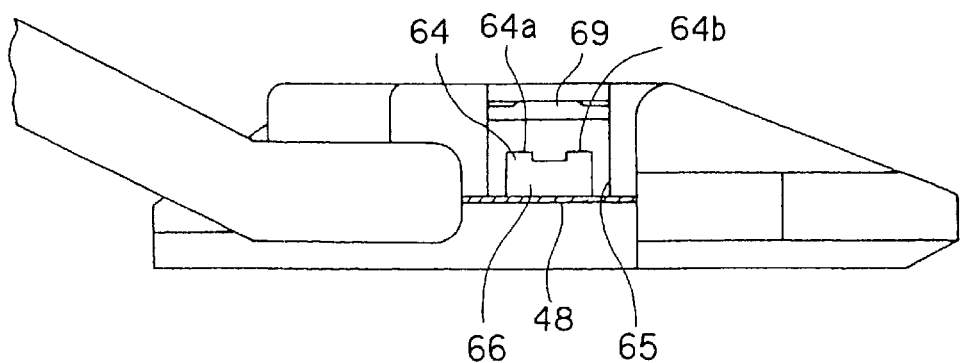
FIG. 23 is a side view thereof.
Figure 24:
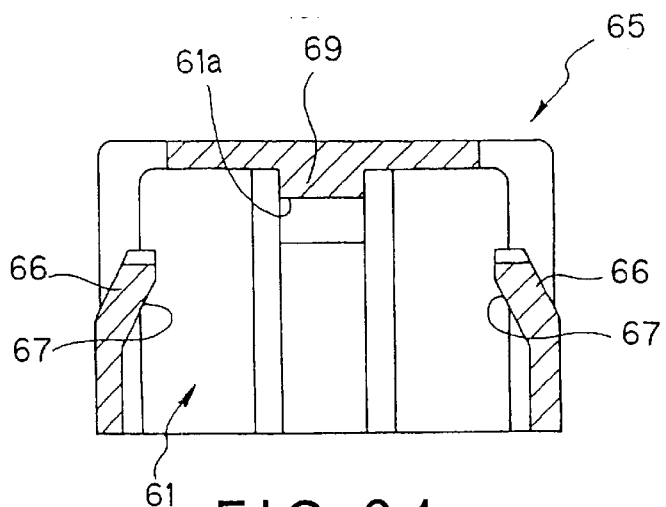
FIG. 24 is a cross-sectional view along a line A3–A4 in FIG. 22.
Figure 25:
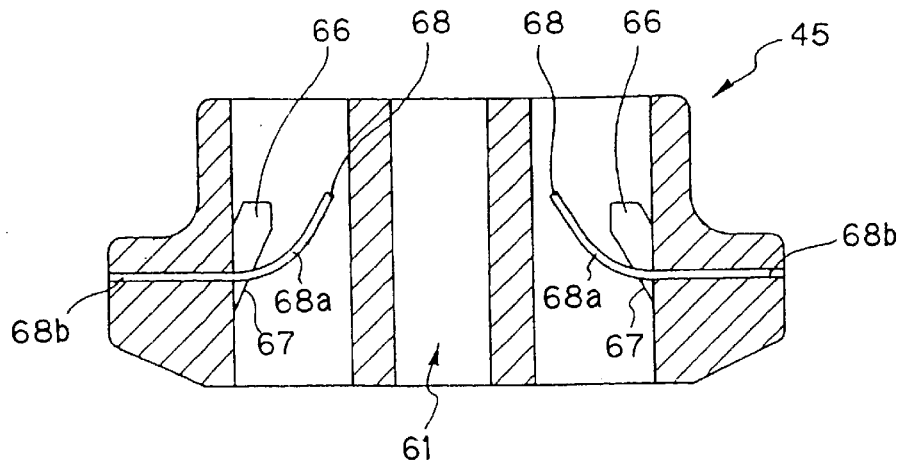
FIG. 25 is a cross-sectional view along a line A1–A2 in FIG. 22.

In the attachment hole 61, as shown in FIG. 25, feeding terminals 68 formed by bending the distal ends of the pair of conductive members 42 are provided to protrude. The feeding terminals 68 are for feeding the coil 51 wound on the bobbin 52 inserted in the attachment hole 61, and electrically contact the coil connection terminals 56 on which the connection terminals 58 of the coil 51 are wound. The feeding terminals 68 are provided at positions which enable contact with the coil connection terminals 56 on which the connection terminals 58 of the coil 51 wound on the bobbin 52 are wound when the bobbin 52 is attached in the attachment hole 61. As shown in FIG. 22, the feeding terminals 68 are provided to protrude on the lateral surfaces facing each other of the attachment hole 61, on the side where the first holding pieces 62 are provided.

Each of the feeding terminals 68 formed by bending the distal ends of the pair of conductive members 42 has a bent portion 68a which protrudes within the attachment hole 61 and elastically contacts the coil connection terminal 56, and a portion 68b where the head attaching portion 45 made of a synthetic resin is molded, as shown in FIG. 25. The bent portion 68a is formed by bending the feeding terminal 68 from one end of the head attaching portion 45 along the direction of inserting the bobbin 52 into the attachment hole 61, and by a stress caused by this bending, the feeding terminal 68 elastically contacts the coil connection terminal 56.

Of the feeding terminals 68, at least parts of the bent portions 68a which contact the coil connection terminals 56 are processed by one of gold plating, nickel plating and solder plating, in order to reduce the electric resistance at the time of contact. It is desired that a material used for plating has smaller electric resistance than the feeding terminals 68 in order to reduce the electric resistance at the time of contact. Similarly, it is desired that at least parts of the coil connection terminals 56 which contact the bent portions 68a are processed by one of gold plating, nickel plating and solder plating, in order to reduce the electric resistance at the time of contact.

Figure 27:
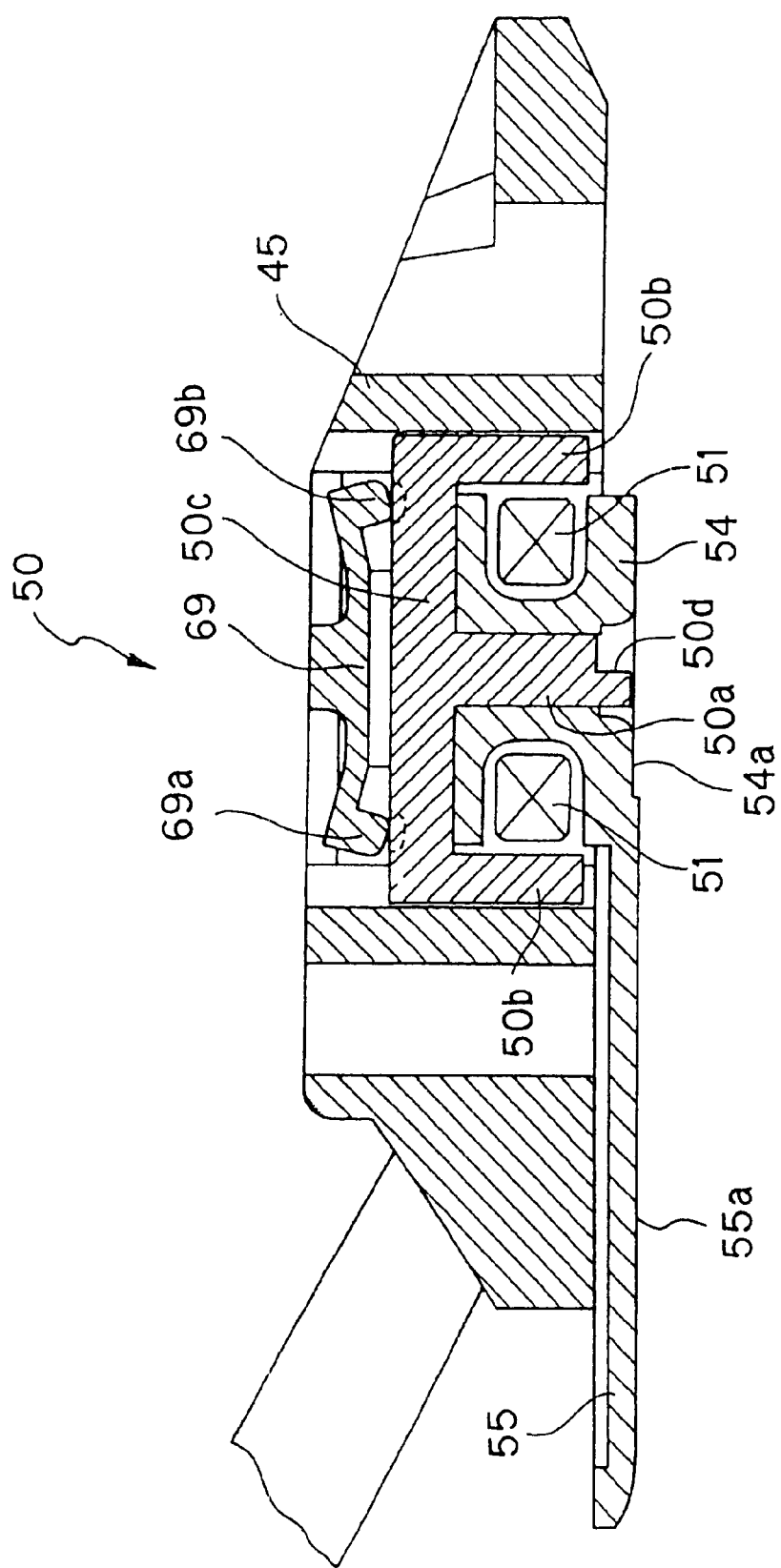
FIG. 27 is a cross-sectional view along a line A7–A8 in FIG. 16.

On a bottom surface 61a of the attachment hole 61, that is, on the inner surface on the top side of the head attaching portion 45, a pressing member 69 for pressing the magnetic core member 50 toward the magneto-optical disc is formed by expansion, as shown in FIGS. 18, 22, 23 and 24. This pressing member 69 has elasticity and is abutted against the base 50c of the magnetic core member 50 constituting the magnetic head 44 attached in the attachment bole 61, thus pressing the magnetic core member 50 toward the magneto-optical disc. Specifically, both end portions 69a, 69b of pressing member 69 are abutted against the base 50c of the magnetic core member 50 and press the magnetic core member 50 toward the magneto-optical disc, as shown in FIG. 27.

As described above, in the magnetic head unit 41, the magnetic head 44 is fixed by engaging the engagement pawl portions 60 formed on the bobbin 52 with the engagement step portions 64 formed on the head attaching portion 45 and pressing the magnetic core member 50 toward the magneto-optical disc by the pressing member 69 formed on the head attaching portion 45.

A gap 60 is formed around the pressing member 69, as shown in FIG. 22, and the magnetic core member 50 pressed by the pressing member 69 is exposed outward from the gap 60. Therefore, the state of the magnetic core member 50 can be visually recognized from outside and a defective magnetic head in which breakage of the magnetic core member 50 or the like has occurred can be immediately detected.

A process of assembling the magnetic head unit 49 constituted as described above will now be described and the assembled magnetic head unit 49 will be described subsequently.

To assemble the magnetic head unit 49, the magnetic core member 50 is attached into the attachment hole 61 of the head attaching portion 45. The magnetic core member 50 is inserted into the attachment hole 61 from an opening end 61 opening on the side of the head attaching portion 45 facing the magneto-optical disc, with a portion of the magnetic core member 50 on the side of the connection part 50c used as an insertion end, as shown in FIG. 18. As both lateral portions on the side of the yoke 50b are fitted between the first holding pieces 62 and the second holding pieces 63, the magnetic core member 50 inserted in the attachment hole 61 is pinched and held by the first holding pieces 62 and the second holding pieces 63 and thus temporarily fixed in the attachment hole 61. In this case, the upper surface of the magnetic core member 50 is abutted against the pressing member 69.

Then, the bobbin 52 having the coil 51 wound thereon is inserted into the attachment hole 61 in which the magnetic core member 50 is arranged. The bobbin 52 is inserted into the attachment hole 61 from the opening end 61 so that the side where the engagement pawl portions 60, 60 are provided to protrude is caused to correspond to the surface of the attachment hole 61 where the engagement step portions 64 are provided and so that the coil connection terminals 56 are caused to correspond to the feeding terminals 68 provided to protrude within the attachment hole 61. In this case, the magnetic core 50a of the magnetic core member 50 is inserted into the magnetic core insertion hole 53 of the bobbin 52. As the bobbin 52 is inserted further into the attachment hole 61, the bobbin 52 is inserted toward the inner side of the attachment hole 61 while the outer lateral surface of the side on which the coil connection terminals 56 are attached is caused to slide in contact with the insertion guide portions 67 formed on the surfaces facing each other of the elastic displacement pieces 66 protruding within the attachment hole 61. In this case, since the bobbin 52 is inserted into the attachment hole 61 with the outer lateral side guided by the insertion guide portions 67, the direction of insertion into the attachment hole 61 is regulated. Therefore, the bobbin 52 is inserted into the attachment hole 61 in such a state that the magnetic core 50a of the magnetic core member 50 temporarily fixed and arranged in the attachment hole 61 is accurately inserted in the magnetic core insertion hole 53.

Figure 26:
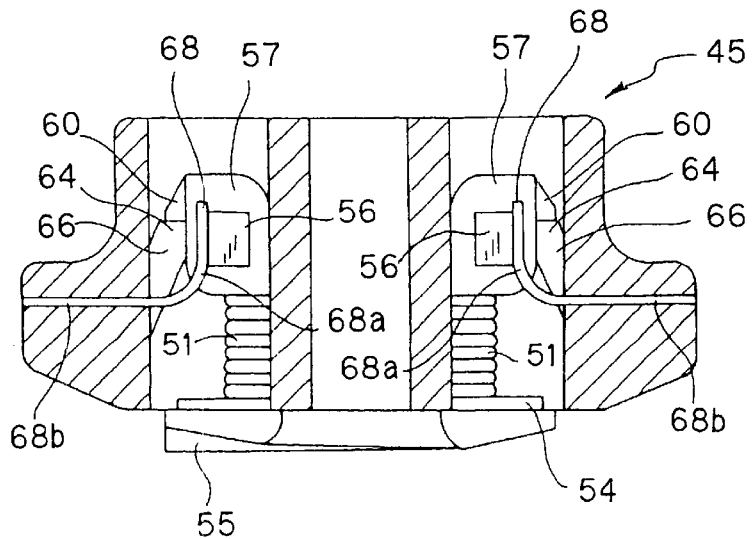
FIG. 26 is a cross-sectional view along a line A5–A6 in FIG. 16.

When the bobbin 52 is being inserted into the attachment hole 61, the elastic displacement pieces 66 are elastically displaced outward from the attachment hole 61 by the engagement pawl portions 60. As the bobbin 52 is further inserted, the engagement pawls 60a at the distal ends of the engagement pawl portions 60 reach the engagement step portions 64 formed at the distal ends of the elastic displacement pieces 66 and the elastic displacement pieces 66 are elastically restored, thus realizing relative engagement of the engagement pawl portions 60 with the engagement step portions 64, as shown in FIG. 26. In this case, the bobbin 52 is pressed toward the magneto-optical disc by the pressing member 69 via the magnetic core member 50, as shown in FIG. 27. Thus, the bobbin 52 is attached and fixed in the attachment hole 61 so that the flange portion 54 is exposed to the side of the head attaching portion 45 facing the magneto-optical disc.

Moreover, when the bobbin 52 is attached in the attachment hole 61, the coil connection terminals 56 are pressured in contact with the feeding terminals 68 protruding within the attachment hole 61, as shown in FIG. 26, thus realizing electric connection of the coil 51 with the conductive member 42. The feeding terminals 68 have the elastic bent portions 68a and pressured contact is made in such a state that the bent portions 68 provide elastic forces to the coil terminal connection 56, thus realizing secure electric contact.

The magnetic head unit 49, assembled as described above, can be assembled simply by sequentially inserting the magnetic core member 50 and the bobbin 52 having the coil 51 wound thereon into the attachment hole 61, and there is no need to use an adhesive for fixing the magnetic core member 50 and the coil 51 to the head attaching portion 45. Therefore, the assembly is very easy. Since the position of attachment of the magnetic head 44 to the head attaching portion 45 can be determined by the position of relative engagement of the engagement pawls 60a with the engagement step portions 64, the positioning of the attachment position can be carried out accurately and easily. In this magnetic head portion 49, there is no need to use solder or the like for the connection between the coil connection terminals 56 provided on the bobbin 52 and the feeding terminals 68. Therefore, the work for assembling the magnetic head portion 49 is extremely simple.

Meanwhile, in the magnetic head portion 49, the bobbin 52 has the step between the surface facing the major surface of the magneto-optical disc near the magnetic core insertion hole 53 and the surface facing the major surface of the magneto-optical disc in the sliding contact portion 55. When the sliding contact portion 55 slides in contact with the magneto-optical disc, a predetermined gap is formed between the portion near the magnetic core insertion hole 53 and the magneto-optical disc Therefore, when the magnetic head portion is caused to slide in contact with the magneto-optical disc, the gap between the magnetic core 50a of the magnetic core member 50 inserted in the magnetic core insertion hole 53 and the magneto-optical disc is determined in accordance with the step, the height of the bobbin 52 in the axial direction of the magnetic core insertion hole 53 and the length of the magnetic core 50a extending from the base 50c to the step 50d. Therefore, by forming the bobbin 52 and the magnetic core member 50 with high accuracy, it is possible to accurately maintain the gap between the magnetic core 50a and the magneto-optical disc, that is, the flying height of the magnetic core member 50, at a constant value.

Specifically, in this magnetic head unit 41, the flying height of the magnetic core member 50 over the magneto-optical disc is regulated only by the shapes of the bobbin 52 and the magnetic core member 50. Therefore, in the magnetic head unit 41, only the bobbin 52 and the magnetic core member 50 require particularly high processing accuracy. The supporting member made up of the head attaching portion 45, the head support 46 and the fixed portion 43 which are integrally molded with the conductive members 42 does not require high processing accuracy. That is, the metal mold used for molding the supporting member of the magnetic head unit 41 does not require high accuracy and the supporting member can be easily manufactured.

The head support 46 which supports the magnetic head unit 49, constituted as described above, at the distal end via the second elastic displacement portions 48 will now be described.

The head support 46 is formed by molding a synthetic resin between the pair of conductive members 42. Since the head support 46 is formed by molding a synthetic resin between the pair of conductive members 42, the head support 46 fixes the positions of the pair of conductive member 42 and provides rigidity to these conductive members 42. The head support 46 supports the head attaching portion 45 constituting the magnetic head portion 49 attached at the distal ends of the conductive members 42 so that the head attaching portion 45 can fluctuated and displaced from the second elastic displacement portions 48 as the center.

When the head support 46 is not operated to fluctuate, the head support 46 is obliquely arranged so that it gradually approaches the magneto-optical disc from the fixed portion 43 to the head attaching portion 45.

On the side of the head support 46 where the head attaching portion 45 is supported, a first cut-out portion 46a is formed, to which the portion on the sliding contact portion 55 of the magnetic head 44 attached to the head attaching portion 45 is exposed, as shown in FIG. 14. When the head attaching portion 45 is fluctuated and displaced from the second elastic displacement portions 48 as the center, the portion on the sliding contact portion 55 is caused to enter the first cut-out portion 46a of the head support 46.

On the lateral edge of the head support 46 adjacent to the fluctuation quantity regulating arm 72, a second cut-out portion 46b is formed so as to prevent a second regulating piece 72b of the fluctuation quantity regulating arm 72, which will be described later, and the head support 46 from overlapping each other when the magnetic head unit 41 is projected in a plan view.

The fixed portion 43 and the fluctuation quantity regulating arm 72, and the head attaching portion 45 and the head support 46, are simultaneously molded by insertion molding in which a synthetic resin is injected and molded in a cavity of the metal mold device having the pair of conductive members 42 arranged therein. By thus providing the second cut-out portion 46b of the head support 46 and preventing the second regulating piece 72b of the fluctuation quantity regulating arm 72 and the head support 46 from overlapping each other when the magnetic head unit 41 is projected in a plan view, it is possible to mold the magnetic head unit 41 in a pair of upper and lower metal molds and to improve the production efficiency of the magnetic head unit 41.

The fixed portion 43 provided on the proximal end side of the pair of conductive members 42 will now be described.

The fixed portion 43 is for fixing and supporting the magnetic head unit 41 on the attachment base which moves along the radial direction of the magneto-optical disc synchronously with the optical pickup unit arranged inside the magneto-optical recording/reproducing device. A fixed member insertion hole 74 in which a fixed member such as a fixed screw fixed to the attachment base is inserted is provided in the fixed portion 43. On the bottom side of the fixed portion 43, engagement recess portions are provided to protrude which are engaged with a pair of positioning pins provided to protrude on the attachment base.

Figure 28:
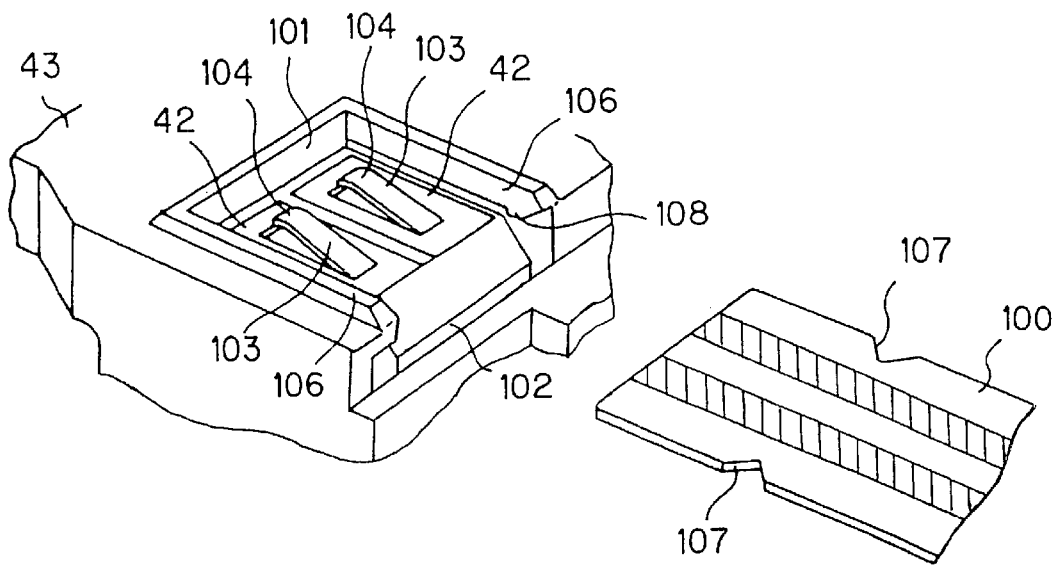
FIG. 28 is a perspective view showing an external circuit connecting portion provided on a fixed portion.
Figure 29:
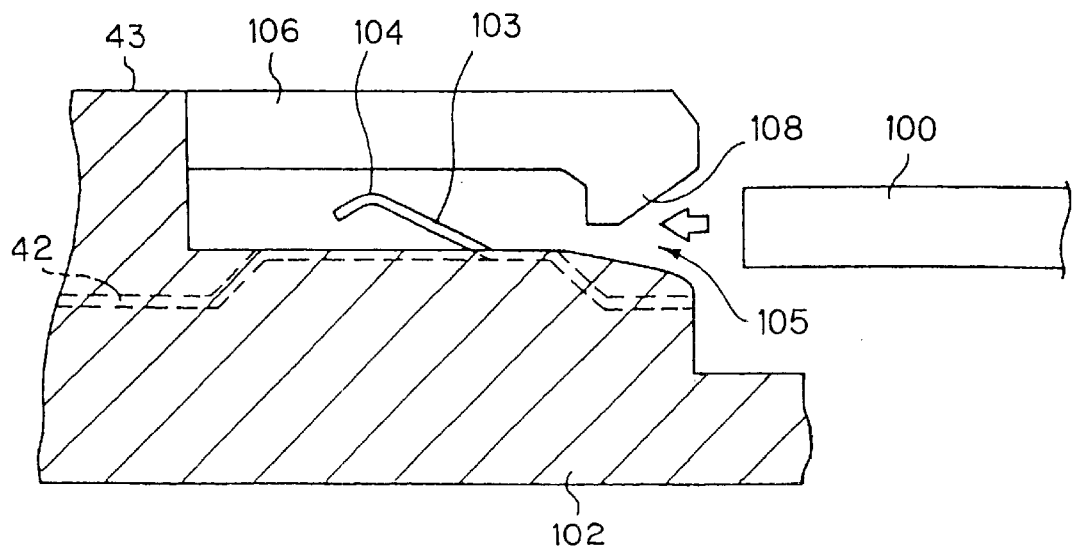
FIG. 29 is a cross-sectional view thereof.

On the fixed portion 43, an external circuit connecting portion 101 is provided to which a flexible printed wiring board and a flat connection cable 100 such as a flexible flat cable is connected for electrically connecting the magnetic head 44 attached to the head attaching portion 45 supported on the distal end side of the head support 46 with an external circuit, as shown in FIGS. 16, 28 and 29. The external circuit connecting portion 101 has a terminal portion supporting piece 102 provided to protrude on the proximal end side of the fixed portion 43, and terminal portions 103 formed on the proximal end side of the pair of conductive members 42 are extended on one major surface of the terminal portion supporting piece 102.

These terminal portions 103 are formed by providing substantially U-shaped tapered cut-in parts in the pair of conductive members 42 electrically connected with the coil 51 of the magnetic bead 44 via the feeding terminals 68, and are elastically displaceable with their connecting portion sides to the conductive members 42 as the fulcrums. The terminal portions 103 are bent to protrude above the terminal portion supporting piece 102 and have bent portions 104 on their distal end sides. Therefore, as the bent portions 104 protruding above the terminal portion supporting piece 102 are pressed, the terminal portions 103 are elastically displaced toward the terminal portion supporting piece 102 with the connecting portion sides to the conductive members 42 as the fulcrums.

In the terminal portion supporting piece 102, cut-out holes are provided for entering the distal end sides of the terminal portions 103 when the terminal portions 103 are elastically displaced.

On both lateral sides facing each other of the terminal portion supporting piece 102, a pair of connection cable supporting pieces 106 are provided which form an insertion groove 105 for inserting the connection cable 100 electrically connected with the terminal portions 103 in cooperation with the terminal portion supporting piece 102. These connection cable supporting pieces 106 are formed to protrude above the terminal supporting piece 102 from the fixed portion 43 and form the insertion groove 105 together with the terminal portion supporting piece 102. On the lower sides facing the terminal portion supporting piece 102 of the connection cable supporting pieces 106, retaining pawls 108 are provided to protrude, which are engaged with cut-out grooves 107 formed by cutting out both sides of the connection cable 100 inserted in the insertion groove 105.

As the connection cable 100 is inserted into the insertion groove 105 from its distal end side, the connection table 100 is connected with the external circuit connecting portion 101 so that it is held between terminal portion supporting piece 102 and the connection cable supporting pieces 106. In this case, the connection cable 100 causes a connection pattern portion to be pressed in contact with the terminal portions 103 flexibly deformed to extend over the terminal portion supporting piece 102. As the connection pattern portion is pressed in contact with the terminal portions 103, the connection cable 100 is electrically connected with the pair of conductive members 42. The coil 51 of the magnetic head 44 is electrically connected with the external circuit via the connection cable 100 and the pair of conductive members 42, and enters the state in which the coil 51 is fed by the external circuit.

On the fixed portion 43, the fluctuation quantity regulating arm 72, which is formed to protrude from the proximal end side of the pair of conductive members 42 toward the distal end side of the conductive members 42 and adapted for regulating the quantity of fluctuation of the head attaching portion 45 and the head support 46, is integrally formed by using the same synthetic resin material as the fixed portion 43, as shown in FIGS. 16 and 17. Specifically, the fluctuation quantity regulating arm 72 is formed to extend along the head support 46 and the head attaching portion 45 from the fixed portion 43. At the distal end portion of the fluctuation quantity regulating arm 72, a first regulating portion 72a is formed which is abutted against the head attaching portion 45 to regulate the quantity of fluctuation of the head attaching portion 45 when the head attaching portion 45 and the head support 46 fluctuate. At the halfway portion of the fluctuation quantity regulating arm 72, a second regulating portion 72b is formed which is abutted against the head support 46 to regulate the quantity of fluctuation of the head support 46 when the head attaching portion 45 and the head support 46 fluctuate.

The first regulating piece 72a is formed to protrude from the distal end portion of the fluctuation quantity regulating arm 72 toward the head attaching portion 45. The first regulating piece 72a is arranged at a position slightly away from the distal end of the head attaching portion 45, as projected in a plan view, when the head support 46 and the head attaching portion 45 do not fluctuate. When the head support 46 and the head attaching portion 45 are operated to fluctuate in the direction away from the loaded disc cartridge, the first regulating piece 72a is abutted against the distal end portion of the head attaching portion 45 and regulates the quantity of fluctuation of the head attaching portion 45.

The second regulating piece 72b is formed to protrude from the halfway portion of the fluctuation quantity regulating arm 72 toward the head support 46. The second regulating piece 72b is arranged at a position right above the second cut-out portion 46b formed in the head support 46, as projected in a plan view, when the head support 46 and the head attaching portion 45 are not operated to fluctuate. When the head support 46 and the head attaching portion 45 are operated to fluctuate in the direction away from the loaded disc cartridge, the second regulating piece 72b is abutted against a site adjacent to the second cut-out portion 46b of the head support 46 and regulates the quantity of fluctuation of the head support 46.

When a disc cartridge housing a magneto-optical disc is to be inserted in or ejected from the magneto-optical recording/reproducing device, the head attaching portion 45 and the head support 46 of the magnetic head unit 41 attached inside the magneto-optical recording/reproducing device are operated to fluctuate in the direction away from the position for setting the magneto-optical disc by a fluctuation operation member, which will be described later, in order to form a sufficient space from the optical pickup unit so as to carry out insertion or ejection of the disc cartridge. In this case, the first regulating piece 72a of the fluctuation quantity regulating arm 72 is abutted against the head attaching portion 45 and the second regulating piece 72b is abutted against the head support 46, thus regulating the quantities of fluctuation.

In this magnetic head unit 41, excessive fluctuation of the head attaching portion 45 and the head support 46 is regulated without putting excessive burden on the second elastic displacement portions 48, and therefore deformation and damage of the first elastic displacement portions 47 and the second elastic displacement portions 48 can be prevented. At the same time, the height position of the head attaching portion 45 after fluctuation can be regulated.

Figure 30:
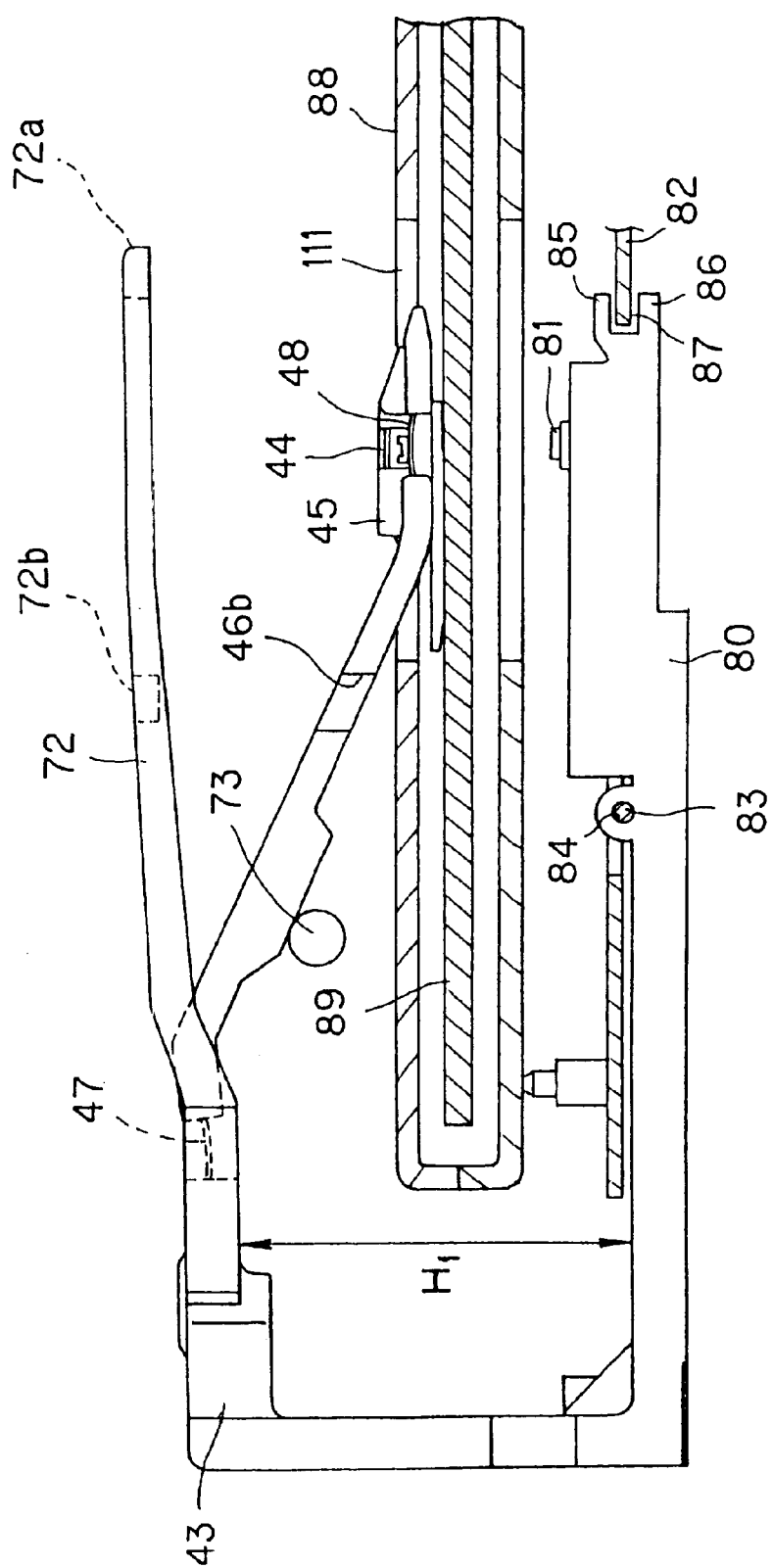
FIG. 30 is a side view showing a state such that the magnetic head portion of the magnetic head unit slides in contact with the magneto-optical disc.
Figure 31:
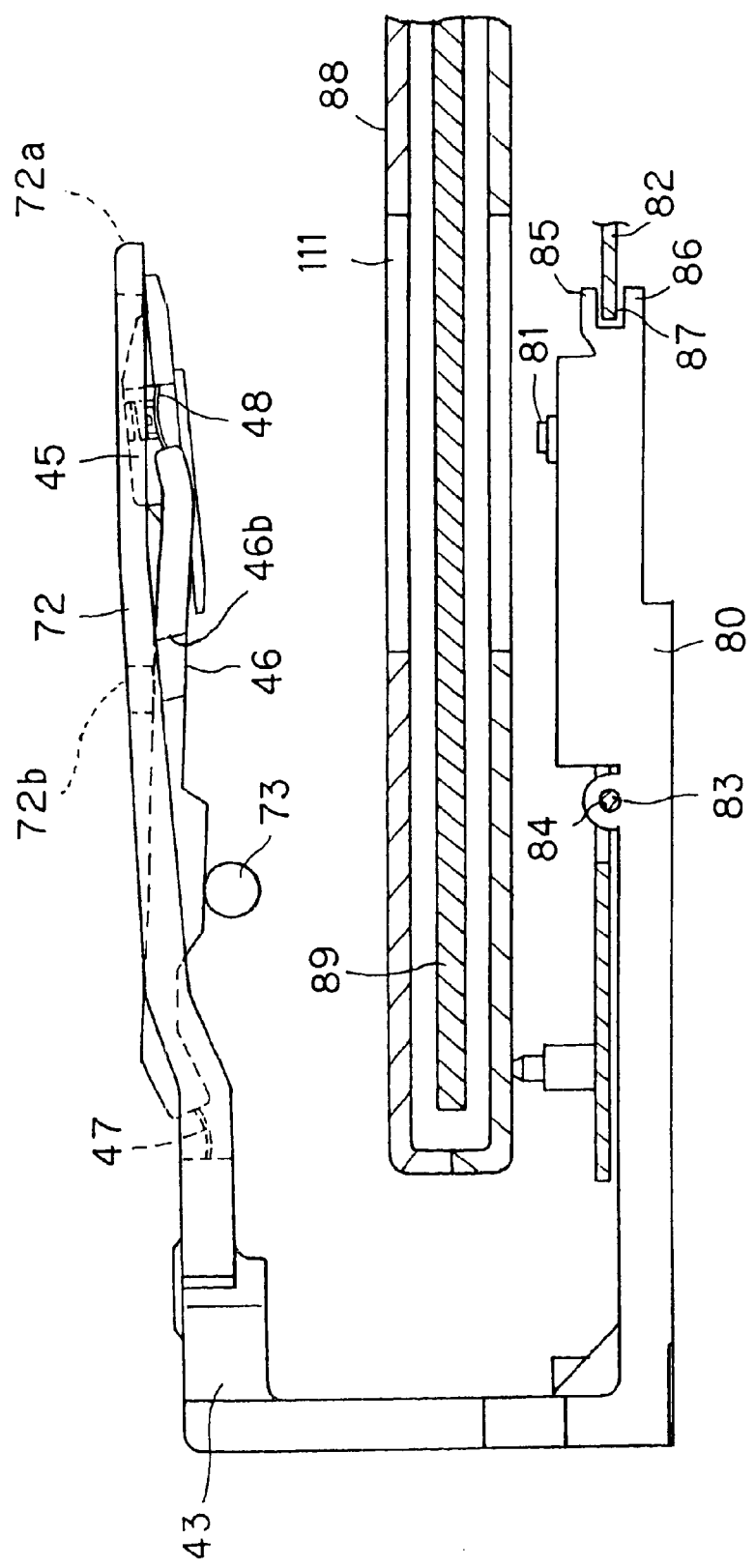
FIG. 31 is a side view showing a state such that the magnetic head portion of the magnetic head unit is moved away from the magneto-optical disc.

The magnetic head unit 41 constituted as described above is mounted on a moving base 80 movably attached within the magneto-optical recording/reproducing device, as shown in FIGS. 30 and 31. An optical pickup unit 81 is also mounted on the moving base 80. Therefore, in the magneto-optical recording/reproducing device, the magnetic head unit 41 moves synchronously with the optical pickup unit 81.

The moving base 80, on which the magnetic head unit 41 and the optical pickup unit 81 are mounted, is supported to be movable along the radial direction of a magneto-optical disc 89 housed in a disc cartridge 88 loaded in the magneto-optical recording/reproducing device, as a slide guide shaft 83 attached to a chassis substrate 82 on which a mechanical portion such as a disc rotation driving mechanism is mounted is caused to penetrate a through-hole 84 provided at a halfway part and then a slide guide portion 87 provided on one side of the chassis substrate 82 is supported by a pair of upper and lower engaging pieces 85, 86 provided to protrude on one end side. The moving base 80 is operated to move along the radial direction of the magneto-optical disc 89 via a pickup feed mechanism driven by a driving motor, not shown.

The optical pickup unit 81 is mounted on the distal end side of the moving base 80 so that an objective lens for condensing a light bean emitted from a light source onto the signal recording layer of the magneto-optical disc 89 faces the magneto-optical disc 89. In this case, the optical pickup unit 81 is mounted on the moving base 80 so that the optical axis of the objective lens is situated on the centerline of the magneto-optical disc 89.

On the other end side of the moving base 80, that is, the opposite side of the one end side where the optical pickup unit 81 is mounted, the magnetic head unit 41 is mounted. The fixed portion 43 of the magnetic head unit 41 is mounted on the moving base 80 so that the head support 46 extends on the disc cartridge 88 loaded on the cartridge loading portion. The magnetic head unit 41 is mounted on the moving base 80 by the fixed screw inserted in the fixed member insertion hole 74 and fitted in the moving base 80, as the engagement recess portions provided on the bottom side of the fixed portion 43 are engaged with the positioning pins provided to protrude on the distal end surface of the moving base 80 so as to determine the mounting position.

When the magnetic head unit 41 is mounted on the moving base 80, the magnetic core 50a of the magnetic core member 50 constituting the magnetic head 44 attached to the head attaching portion 45 supported at the distal end of the head support 46 via the second elastic displacement portions 48 is caused to face the objective lens of the optical pickup unit 81, with the magneto-optical disc 89 held between them. The purpose of this arrangement is to apply an external magnetic field to the light beam casting position on the magneto-optical disc 89.

As the moving base 80 is driven by the pickup feed mechanism, the magnetic head unit 41 mounted on the moving base 80 is sent in the radial direction of the magneto-optical disc 89, integrally with the optical pickup unit 81. The direction of the movement of the magnetic head unit 41 with respect to the magneto-optical disc 89 is a direction orthogonal to the longitudinal direction of the head support 46.

Meanwhile, the head support 46 extended on the disc cartridge 88 from the fixed portion 43 having a height H1 for holding the space for inserting and ejecting the disc cartridge 88, via the first elastic displacement portions 47, is obliquely formed so as to gradually approach the magneto-optical disc 89 loaded on the cartridge loading portion from the side of the fixed portion 43 toward the distal end portion side where the head attaching portion 45 is supported, as described above, in order to cause the head attaching portion 45 supported at the distal end of the head support 46 to slide in contact with the magneto-optical disc 89 loaded on the cartridge loading portion.

When the above-described fluctuation operation member 73 is not operated to fluctuate, the head support 46 causes the head attaching portion 45 supported on the distal end side to enter the disc cartridge 88 and causes the sliding contact portion 55 formed on the bobbin 52 to slide in contact with the magneto-optical disc 89, as shown in FIG. 28. When the sliding contact portion 55 is sliding in contact with the magneto-optical disc 89, as shown in FIG. 30, the first elastic displacement portions 47 are elastically displaced to provide an energizing force to energize the head support 46 toward the magneto-optical disc 89.

In the magneto-optical recording/reproducing device in which the magnetic head unit 41 is mounted, there is provided a head fluctuation operation mechanism, not shown, which operates the fluctuation operation member 73 to fluctuate the head attaching portion 45 and the head support 46 from the first elastic displacement portions 47 as the center into the direction away from the disc cartridge 88. The head fluctuation operation mechanism operates the fluctuation operation member 73 to fluctuate the head attaching portion 45 and the head support 46 from the first elastic displacement portions 47 as the center into the direction away from the disc cartridge 88. In this case, the head attaching portion 45 of the magnetic head unit 41 is fluctuated to a position where it is abutted against the first regulating portion 72a of the fluctuation quantity regulating arm 72, and the head support 46 is fluctuated to a position where it is abutted against the second regulating portion 72b, as shown in FIG. 29. By thus fluctuating and displacing the head attaching portion 45 and the head support 46, the head attaching portion 45 is released from the disc cartridge 88 and a sufficient space from the optical pickup unit 81 for inserting or ejecting the disc cartridge 88 is formed, as shown in FIG. 31.

The magnetic head unit 41 mounted in the magneto-optical recording/reproducing device is moved in the radial direction of the magneto-optical disc 89, using the direction orthogonal to the extending direction of the head support 46 as the direction of movement. When the head attaching portion 45 is moved until the magnetic core 50a of the magnetic core member 50 is situated on the outermost circle side in the signal recording are of the magneto-optical disc 89, one side of the sliding contact portion 55 protrudes on the outer circumference of the magneto-optical disc 89. Thus, in order to prevent the one side of the sliding contact portion 55 from protruding from the magneto-optical disc 89 even when the head attaching portion 45 is moved to the outermost circle side of the magneto-optical disc 89, the inclined portion 55b inclined along the outer circumference of the magneto-optical disc 89 is formed on the one side of the sliding contact portion 55. Specifically, since the one side of the sliding contact portion 55 situated on the outer circumferential side of the magneto-optical disc is caused to be the inclined portion 55b, even when the head attaching portion 45 is moved to the thick outer circumferential side of the magneto-optical disc 89, the sliding contact portion 55 does not ride on the thick outer circumferential portion of the magneto-optical disc 89 and the sliding contact surface 55a of the sliding contact portion 55 securely slides in contact with the signal recording area of the magneto-optical disc 89 over the entire surface of the magneto-optical disc.

It is desired that the sliding contact portion 55 protruding toward the side of the fixed portion 43 of the supporting member is formed to have as large a quantity of protrusion as possible in order to reduce the equivalent mass. In recording, the magnetic head 49, having the sliding contact portion 55 attached thereto, passes through a window portion 111 of the disc cartridge 88 and slides in contact with the magneto-optical disc 89 housed in the disc cartridge 88. Therefore, the quantity of protrusion of the sliding contact portion 55 is regulated by the window portion 111 of the disc cartridge 88. However, it is desired to secure as large a quantity of protrusion as possible for the sliding contact portion 55.

By thus forming the sliding contact portion 55 to have as large quantity of protrusion as possible and thus reducing the equivalent mass, the defocusing quantity can be reduced.

Since the bobbin 52, having the sliding contact portion 55 formed thereon, relatively slides in contact with the rotating magneto-optical disc 89, it is desired that the bobbin 52 has excellent sliding property and wear resistance and a light weight and is made of a material which achieves high dimensional accuracy when molded. As the material constituting the bobbin 52, a synthetic resin material is used, such as polyphenylene sulfide (PPS), polyacetal (POM), polyarylate (PAR), polyimide 6, polyamide 66, polyethylene terephthalate (PET), polybutylene terephthalate (PBT), ultra-high molecular weight polyethylene (UHMW-PE), high molecular weight polyethylene (HMW-PE) or the like.

Since the fixed portion 43, the head support 46, the head attaching portion 45 and the fluctuation quantity regulating arm 72 do not contact the magneto-optical disc, these member do not need to use a material having excellent sliding property and wear resistance and can be formed by using an inexpensive resin material.

The fixed portion 43, the head attaching portion 45, the head support 46 and the fluctuation quantity regulating arm 73, made of a synthetic resin material, are simultaneously formed by insertion molding in which the synthetic resin material is injected and molded in the cavity of the metal mold having the pair of conductive members 42 arranged therein.

In this case, the magnetic head unit 41 can be formed by a single molding operation with a pair of upper and lower metal molds because the head attaching portion 45, the head support 46, the fixed portion 43 and the fluctuation quantity regulating arm 72 are arranged so as not to overlap each other, when projected in a plan view.

In the case where appropriate materials are selected for molding the fixed portion 43, the head attaching portion 45, the head support 46 and the fluctuation quantity regulating arm 72, respectively, a bicolor molding method may be used.

The feeding terminals 68 and the terminal portions 103 formed on the pair of conductive members 42 are processed by one of gold plate, nickel plating, and solder plating. By performing such plating processing, the contact resistance of the feeding terminals 68 and the terminal portions 103 are reduced and good electrical contact is realized.

Moreover, through-holes 109 for exposing parts of the conductive members 42 which are buried in the fixed portion 43 outward are provided on the upper side of the fixed portion 43, as shown in FIG. 16. Similarly, through-holes 110 for exposing parts of the conductive members 42 which are buried in the head support 46 outward are provided on the upper side of the head support 46. The parts of the conductive members 42 exposed through these through-holes 109, 110 are contact parts with respect to a checking equipment for checking the connection state of the conductive members 42 with the coil 51 of the magnetic head 44 and the electric property of the magnetic head 44.

The parts of the pair of conductive members 42 which are exposed outward and constitute the first elastic displacement portions 47 and the second elastic displacement portion 48 are also processed by one of gold plate, nickel plating, and solder plating. Thus, these parts are made anticorrosive.

In the above-described example, the present invention is applied to the magneto-optical disc recording/reproducing device for recording and reproducing an information signal. However, the present inventions may also be applied to a device having only the recording function.

In the above-described example, the present invention is applied to the magneto-optical disc recording/reproducing deice using a magneto-optical recording medium as a recording medium. However, the magnetic head according to the present invention is not limited to the above-described example and can also be applied to a magnetic recording medium such as a magnetic disk or a magnetic tape.

Industrial Applicability

As described above, the magnetic head according to the present invention can efficiently release the heat generated in the magnetic core toward the proximal end side while improving the magnetic field generation efficiency at the distal end portion of the magnetic core, and can also realize a magnetic head for high-speed recording which can achieve a higher transfer rate. If the magnetic head is applied to the magneto-optical disc recording device, a higher transfer rate of recording data is realized -and high-speed recording is made possible.

What is claimed is:

1. A magnetic head comprising:
   a substantially prism-shaped magnetic core portion having a distal end portion cut out to form a step, the magnetic core portion being form so that the cross-sectional area of the distal end portion is smaller than the cross-sectional area of a proximal end portion; and
   a coil wound on the outer circumferential surface of the magnetic core portion;
   wherein the length of one side of the distal end portion is not less than 0.3 mm and not more than 0.45 mm, and the length of the other side orthogonal to the one side is not less than 0.4 mm and not more than 0.55 mm.

2. The magnetic head as claimed in claim 1, wherein the height of the step is not less than 0.3 mm and not more than a half of the length of the magnetic core portion.

3. A magnetic head comprising:
   a core formed substantially in an E-shape by a substantially prism-shaped magnetic core portion having a distal end portion cut:out to form a step, the magnetic core portion being form so that the cross-sectional area of the distal end portion is smaller than the cross-sectional area of a proximal end portion, and a pair of yokes arranged on both sides of the magnetic core portion; and
   a coil wound on the outer circumferential surface of the magnetic core portion and supplied with a current based on an information signal to be recorded onto a recording medium;
   wherein the length of one side of the distal end portion of the magnetic core portion that is substantially parallel to the direction of movement of the recording medium is not less than 0.3 mm and not more than 0.45 mm, and the length of one side substantially orthogonal to the direction of movement of the recording medium is not less than 0.4 mm and not more than 0.55 mm.

4. The magnetic head as claimed in claim 3, wherein the height of the step is not less than 0.3 mm and not more than a half of the length of the magnetic core portion.

5. A magneto-optical disc recording device comprising:
   an optical pickup unit arranged on the side of one surface of a magneto-optical disc and adapted for casing a condensed light beam to the magneto-optical disc; and
   a magnetic head arranged on the side of the other surface of the magneto-optical disc to face the optical pickup, the magnetic head having a core formed substantially in an E-shape by a substantially prism-shaped magnetic core portion having a distal end portion cut out to form a step, the magnetic core portion being formed so that the cross-sectional area of the distal end portion is smaller than the cross-sectional area of a proximal end portion, and a pair of yokes arranged on both sides of the magnetic core portion, the magnetic head also having a coil wound on the outer circumferential surface of the magnetic core portion, wherein the length of one side of the distal end portion substantially orthogonal to a recording track on the magneto-optical disc is not less than 0.3 mm and not more than 0.45 mm, and the length of one side substantially parallel to the recording track of the magneto-optical disc is not less than 0.4 mm and not more than 0.55 mm.

6. The magneto-optical disc recording device as claimed in claim 5, wherein the height of the step of the magnetic head is not less than 0.3 mm and not more than a half of the length of the magnetic core portion.

* * * * *